United States Patent
Yamaguchi et al.

(10) Patent No.: US 8,823,727 B2
(45) Date of Patent: Sep. 2, 2014

(54) MOBILE ELECTRONIC DEVICE

(75) Inventors: Takeshi Yamaguchi, Yokohama (JP); Masashi Osaka, Yokohama (JP)

(73) Assignee: Kyocera Corporation, Kyoto (JP)

(*) Notice: Subject to any disclaimer, the term of this patent is extended or adjusted under 35 U.S.C. 154(b) by 315 days.

(21) Appl. No.: 13/380,128

(22) PCT Filed: Jun. 24, 2010

(86) PCT No.: PCT/JP2010/060769
§ 371 (c)(1),
(2), (4) Date: Dec. 22, 2011

(87) PCT Pub. No.: WO2010/150852
PCT Pub. Date: Dec. 29, 2010

(65) Prior Publication Data
US 2012/0098851 A1  Apr. 26, 2012

(30) Foreign Application Priority Data

| Jun. 26, 2009 | (JP) | 2009-152946 |
| Aug. 27, 2009 | (JP) | 2009-197434 |
| Mar. 26, 2010 | (JP) | 2010-072695 |

(51) Int. Cl.
*G09G 5/02* (2006.01)

(52) U.S. Cl.
USPC ........... 345/589; 345/590; 345/591; 345/595; 345/3.1; 353/52; 352/41

(58) Field of Classification Search
CPC ............ G09G 5/02; G09G 2320/0666; G09G 2320/0626; G09G 2320/0693; G09G 2320/066; G01J 3/46; G01J 3/463; G01J 5/60
See application file for complete search history.

(56) References Cited

U.S. PATENT DOCUMENTS

| 6,727,489 B2 | 4/2004 | Yano |
| 7,891,826 B2 * | 2/2011 | Fujinawa et al. ............ 353/119 |
| 7,986,293 B2 * | 7/2011 | Yanamoto ..................... 345/102 |
| 2005/0094112 A1 | 5/2005 | Eguchi |
| 2006/0062013 A1 | 3/2006 | Imade |

FOREIGN PATENT DOCUMENTS

| JP | 2002311503 A | 10/2002 |
| JP | 2005136751 A | 5/2005 |
| JP | 2006091257 A | 4/2006 |
| JP | 2007081581 A | 3/2007 |
| JP | 2007087816 A | 4/2007 |
| JP | 2007096542 A | 4/2007 |
| JP | 2008-046536 | * 2/2008 |

(Continued)

OTHER PUBLICATIONS

International Search Report and Written Opinion of PCT/JP2010/060769 dated August 10, 2010.

*Primary Examiner* — Antonio A Caschera
(74) *Attorney, Agent, or Firm* — Lowe Hauptman & Ham, LLP

(57) ABSTRACT

According to one embodiment, a mobile electronic device includes an image projection unit for projecting an image, an image display unit for displaying an image, and a control unit for controlling the image projection unit and the image display unit. When the image projection unit projects an image and the image display unit displays an image, the control unit performs control for making the chromaticity of the image projected by the image projection unit and the chromaticity of the image displayed by the image display unit match each other.

4 Claims, 21 Drawing Sheets

(56) References Cited

FOREIGN PATENT DOCUMENTS

| | | | |
|---|---|---|---|
| JP | 2008046536 A | 2/2008 | |
| JP | 2008058613 A | 3/2008 | |
| JP | 2008250138 A | 10/2008 | |

* cited by examiner

PROJECTION AREA

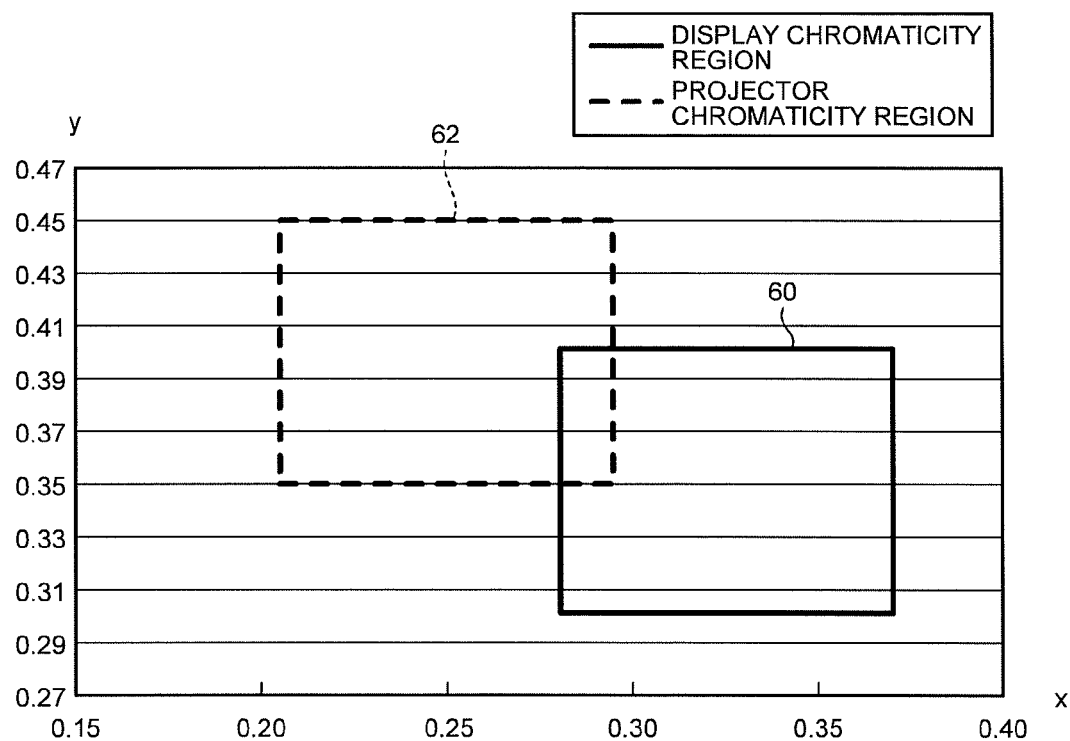

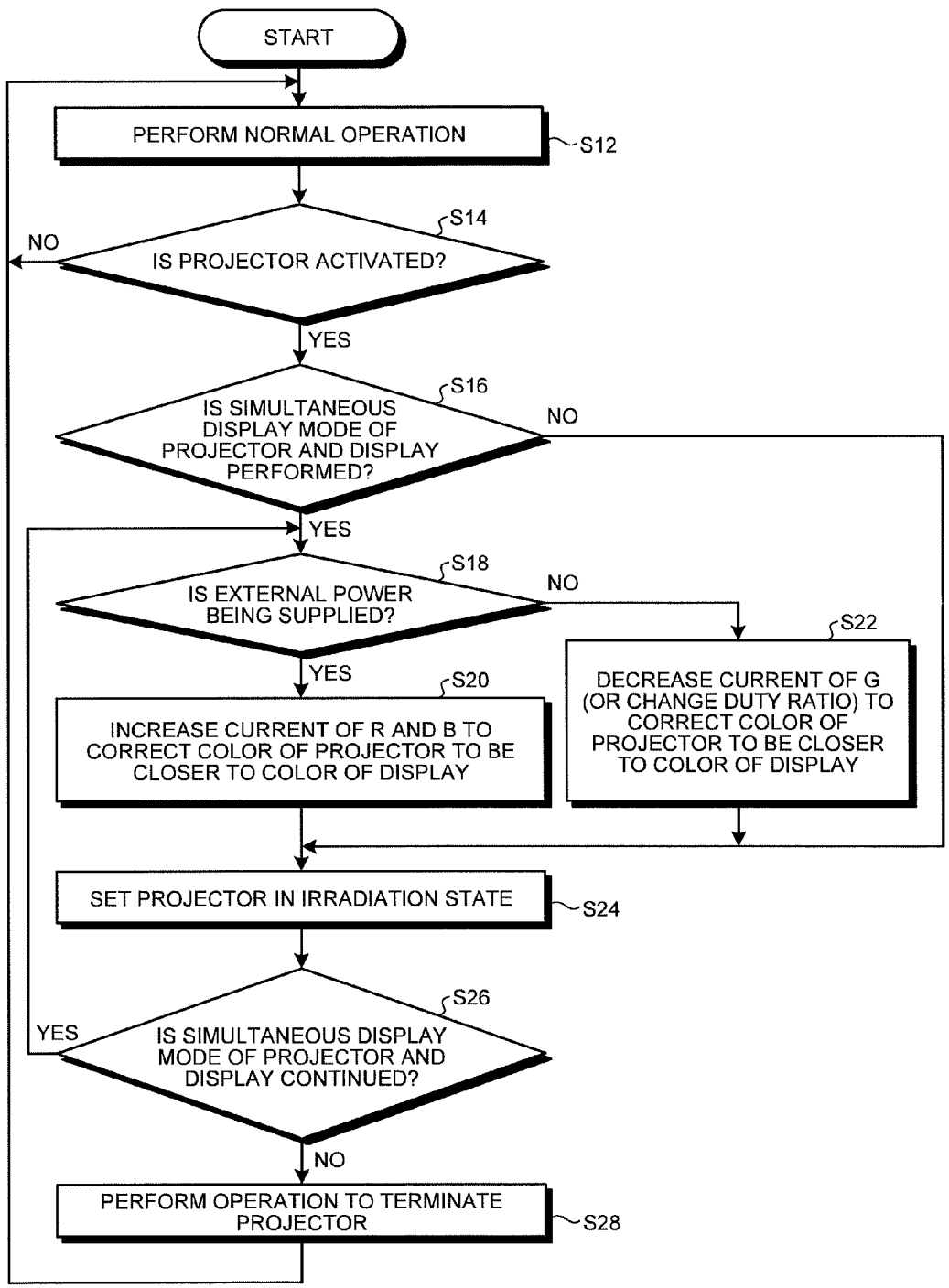

FIG.8A

|  | R | G | B |
|---|---|---|---|
| CURRENT VALUE (mA) | 330 | 330 | 330 |
| VOLTAGE VALUE (V) | 2.16 | 3.28 | 3.46 |
| Duty(%) | 40 | 45 | 15 |
| POWER CONSUMPTION (W) | 0.29 | 0.49 | 0.17 |
| TOTAL | 0.94 | | |

FIG.8B

|  | R | G | B |
|---|---|---|---|
| CURRENT VALUE (mA) | 360 | 330 | 360 |
| VOLTAGE VALUE (V) | 2.20 | 3.28 | 3.50 |
| Duty(%) | 40 | 45 | 15 |
| POWER CONSUMPTION (W) | 0.32 | 0.49 | 0.19 |
| TOTAL | 1.00 | | |

FIG.8C

|  | R | G | B |
|---|---|---|---|
| CURRENT VALUE (mA) | 330 | 300 | 330 |
| VOLTAGE VALUE (V) | 2.16 | 3.20 | 3.46 |
| Duty(%) | 40 | 45 | 15 |
| POWER CONSUMPTION (W) | 0.29 | 0.43 | 0.17 |
| TOTAL | 0.89 | | |

FIG.8D

|  | R | G | B |
|---|---|---|---|
| CURRENT VALUE (mA) | 330 | 330 | 330 |
| VOLTAGE VALUE (V) | 2.16 | 3.28 | 3.46 |
| Duty(%) | 43 | 40 | 17 |
| POWER CONSUMPTION (W) | 0.31 | 0.43 | 0.19 |
| TOTAL | 0.93 | | |

FIG.14

| TEMPERATURE (°C) | R | G | B |
|---|---|---|---|
| -20 | 76.9% | 92.6% | 97.1% |
| 0 | 83.3% | 95.2% | 99.0% |
| 25 | 100.0% | 100.0% | 100.0% |
| 40 | 105.3% | 102.0% | 101.0% |
| 60 | 117.6% | 108.7% | 102.0% |
| 80 | 133.3% | 112.4% | 104.2% |

FIG.15A

| TEMPERATURE (°C) | CURRENT VALUE (mA) | | |
|---|---|---|---|
| | R | G | B |
| -20 | 253.8 | 305.6 | 320.4 |
| 0 | 275.0 | 314.3 | 326.7 |
| 25 | 330.0 | 330.0 | 330.0 |
| 40 | 347.4 | 336.7 | 333.3 |
| 60 | 388.2 | 358.7 | 336.7 |
| 80 | 440.0 | 370.8 | 343.8 |

FIG.15B

| TEMPERATURE (°C) | CURRENT VALUE (mA) | | |
|---|---|---|---|
| | R | G | B |
| -20 | 276.9 | 305.6 | 349.5 |
| 0 | 300.0 | 314.3 | 356.4 |
| 25 | 360.0 | 330.0 | 360.0 |
| 40 | 378.9 | 336.7 | 363.6 |
| 60 | 423.5 | 358.7 | 367.3 |
| 80 | 480.0 | 370.8 | 375.0 |

FIG.15C

| TEMPERATURE (°C) | CURRENT VALUE (mA) | | |
|---|---|---|---|
| | R | G | B |
| -20 | 253.8 | 277.8 | 320.4 |
| 0 | 275.0 | 285.7 | 326.7 |
| 25 | 330.0 | 300.0 | 330.0 |
| 40 | 347.4 | 306.1 | 333.3 |
| 60 | 388.2 | 326.1 | 336.7 |
| 80 | 440.0 | 337.1 | 343.8 |

FIG.16

| TEMPERATURE (°C) | R | G | B |
|---|---|---|---|
| -20 | 100.0% | 120.4% | 126.2% |
| 0 | 100.0% | 114.3% | 118.8% |
| 25 | 100.0% | 100.0% | 100.0% |
| 40 | 100.0% | 96.9% | 96.0% |
| 60 | 100.0% | 92.4% | 86.7% |
| 80 | 100.0% | 84.3% | 78.1% |

FIG.17

| TEMPERATURE (°C) | R | G | B |
|---|---|---|---|
| -20 | 79.2% | 95.4% | 100.0% |
| 0 | 84.2% | 96.2% | 100.0% |
| 25 | 100.0% | 100.0% | 100.0% |
| 40 | 104.2% | 101.0% | 100.0% |
| 60 | 115.3% | 106.5% | 100.0% |
| 80 | 128.0% | 107.9% | 100.0% |

MOBILE ELECTRONIC DEVICE

CROSS-REFERENCE TO RELATED APPLICATION

This application is a National Stage of PCT international application Ser. No. PCT/JP2010/060769 filed on Jun. 24, 2010 which is based upon and claims the benefit of priority from Japanese Patent Application No. 2009-152946 filed on Jun. 26, 2009, Japanese Patent Application No. 2009-197434, filed on Aug. 27, 2009, and Japanese Patent Application No. 2010-072695 filed on Mar. 26, 2010.

FIELD

The present invention relates to a mobile electronic device having an image projection unit which projects an image on a screen or a wall surface.

BACKGROUND

In recent years, as a projector, a small mobile projector which is easy to carry around is proposed. For example, Patent Literature 1 discloses a mobile terminal equipped with a projector function, which includes an upper cabinet, a lower cabinet, and a hinge rotatably connecting the upper cabinet and the lower cabinet together, and in which a projector having a lens and a light source is mounted.

CITATION LIST

Patent Literature

Patent Literature 1: Japanese Patent Application Laid-open No. 2007-96542

Technical Problem

In the mobile terminal disclosed in Patent Literature 1 which includes a projector and a display, a user may feel a sense of incompatibility with an image projected by the projector or an image displayed on the display.

For the foregoing reasons, there is a need for a mobile electronic device by which the user nearly never feels a sense of incompatibility with an image projected by a projector or an image displayed on a display.

SUMMARY OF THE INVENTION

According to an aspect, a mobile electronic device includes an image projection unit for projecting an image, an image display unit for displaying an image, and a control unit for controlling the image projection unit and the image display unit. When the image projection unit projects an image and the image display unit displays an image, the control unit performs control for making the chromaticity of the image projected by the image projection unit and the chromaticity of the image displayed by the image display unit match each other.

According to another aspect, the control unit performs control such that the chromaticity of the image displayed by the image display unit matches the chromaticity of the image projected by the image projection unit.

According to another aspect, the image projection unit projects an image by performing a color-mixing with respect to lights of a plurality of colors, and emits the light of a most contributing color to luminance, among the lights of the plurality of colors, in a larger amount than those of the lights of the other colors, and the image display unit displays an image by performing the color-mixing with respect to the lights of the plurality of colors.

According to another aspect, the control unit performs control such that the lights of the other colors are emitted in a smaller amount than that of the light of the most contributing color to luminance.

According to another aspect, the control unit performs control such that the light of the most contributing color to luminance is emitted in a larger amount than that of the lights of other colors.

According to another aspect, the control unit performs control such that the chromaticity of the image projected by the image projection unit matches the chromaticity of the image displayed by the image display unit.

According to another aspect, the image projection unit projects an image by performing a color-mixing with respect to lights of a plurality of colors, and the image display unit displays an image by performing a color-mixing with respect to the lights of the plurality of colors.

According to another aspect, the control unit performs, when the mobile electronic device is operating with power supplied from a battery, control such that the chromaticity of the image projected by the image projection unit matches the chromaticity of the image displayed by the image display unit.

According to another aspect, the control unit performs control such that the chromaticity of the image displayed by the image display unit matches the chromaticity of the image projected by the image projection unit or such that the chromaticity of the image projected by the image projection unit matches the chromaticity of the image displayed by the image display unit in accordance with whether the mobile electronic device is operating with power supplied from a battery or the mobile electronic device is operating with power supplied from an external power supply.

According to another aspect, the control unit performs control such that the chromaticity of the image displayed by the image display unit differs between when the image projection unit projects an image and the image display unit displays an image and when the image display unit displays an image while the image projection unit does not project an image.

According to another aspect, the control unit performs control such that the chromaticity of the image projected by the image projection unit differs between when the image projection unit projects an image and the image display unit displays an image and when the image projection unit projects an image while the image display unit does not display an image.

According to another aspect, the mobile electronic device further includes a temperature monitoring unit for measuring or for estimating the temperature of a light source of the image projection unit. When performing control of matching the chromaticity, the control unit acquires temperature information from the temperature monitoring unit, and controls the light source on the basis of the temperature information such that the brightness of the light emitted from the light source is close to reference brightness.

According to another aspect, the image projection unit projects an image by performing a color-mixing with respect to lights of a plurality of colors. The control unit performs control on the basis of a change rate of brightness caused by change in temperature for each light of the plurality of colors such that brightness of the light emitted from the light source is close to the reference brightness.

According to another aspect, the control unit switches the control between performing and not-performing control of making the brightness of each color closer to the reference brightness, in accordance with whether the image projection unit is operating with power supplied from a battery or the image projection unit is operating with power supplied from an external power supply.

According to another aspect, the control unit performs, when the image projection unit is operating with power from the external power supply, control such that the brightness of the light emitted from the light source is close to the reference brightness.

According to another aspect, the control unit performs control such that the brightness of the light emitted from the light source is close to the reference brightness, using the brightness of the light emitted from the light source when the temperature of the light source is at a reference temperature as the reference brightness.

According to another aspect, the control unit performs control such that the brightness of the light emitted from the light source is close to the reference brightness, using the current brightness of a light of a color having a maximum change rate of brightness caused by change in temperature, from among light of the plurality of colors, as the reference brightness.

According to another aspect, the control unit performs, when the image projection unit is operating with power supplied from the battery, control such that the brightness of the light emitted from the light source is close to the reference brightness, using the current brightness of color having a maximum change rate of brightness caused by change in temperature, from lights of the plurality of colors, as the reference brightness.

According to another aspect, the mobile electronic device further includes a chromaticity detection unit for detecting a chromaticity of a projection image projected by the image projection unit and displayed on a projection surface. When performing control of matching the chromaticity, the control unit acquires chromaticity information from the chromaticity detection unit, and controls the image projection unit on the basis of the chromaticity information such that the chromaticity of the projection image projected by the image projection unit matches the chromaticity of the image displayed by the image display unit.

According to another aspect, the mobile electronic device further includes a temperature monitoring unit for measuring or for estimating a temperature of the image display unit. When performing control of matching the chromaticity, the control unit acquires temperature information from the temperature monitoring unit, and obtains the chromaticity of an image displayed by the image display unit on the basis of the temperature information.

According to another aspect, the control unit acquires a temperature from the temperature monitoring unit and switches a mode of the chromaticity detection unit to a low power consumption mode when a change in temperature becomes smaller than a predetermined value.

According to another aspect, the mobile electronic device further includes a notification unit for notifying an image or a sound to a user. The chromaticity detection unit detects ambient illuminance. When the illuminance detected by the chromaticity detection unit is larger than a predetermined first threshold value, the control unit notifies that fact to the user by the notification unit.

According to another aspect, the chromaticity detection unit detects ambient illuminance. When the illuminance detected by the chromaticity detection unit is smaller than a predetermined second threshold value, the control unit sets the brightness of the image display unit or the image projection unit as the darkest setting.

According to another aspect, the mobile electronic device further includes a second chromaticity detection unit for detecting a chromaticity of an image displayed on the image display unit. The control unit acquires the chromaticity of the image displayed by the image display unit by the second chromaticity detection unit.

Advantageous Effects of Invention

According to the mobile electronic device of the present invention, the user nearly never feels a sense of incompatibility with an image projected by a projector or an image displayed on a display.

BRIEF DESCRIPTION OF DRAWINGS

FIG. 5 is an enlarged view of the chromaticity regions of FIG. 4.

FIG. 6 is a diagram illustrating a combination of the operation states of a display and a projector.

FIG. 7 is a flowchart illustrating an example of an operation of the mobile electronic device to match the chromaticity of a projector with the chromaticity of a display at the time of pattern 4.

FIG. 8A is a diagram illustrating the control state of an RGB light generation unit at the time of mode 0 of a projector.

FIG. 8B is a diagram illustrating the control state of an RGB light generation unit at the time of mode 1 of a projector.

FIG. 8C is a diagram illustrating the control state of an RGB light generation unit at the time of mode 2 of a projector.

FIG. 8D is a diagram illustrating the control state of an RGB light generation unit at the time of mode 3 of a projector.

FIG. 14 is a chart illustrating each coefficient for correcting the value of a current to be supplied to each light source according to temperature.

FIG. 15A is a diagram illustrating the control state of an RGB light generation unit when brightness is corrected on the basis of temperature information at the time of mode 0 of a projector.

FIG. 15B is a diagram illustrating the control state of an RGB light generation unit when brightness is corrected on the basis of temperature information at the time of mode 1 of a projector.

FIG. 15C is a diagram illustrating the control state of an RGB light generation unit when brightness is corrected on the basis of temperature information at the time of mode 2 of a projector.

FIG. 16 is a chart illustrating each coefficient for correcting the value of a current to be supplied to each light source according to temperature when brightness of R light is set as reference brightness.

FIG. 17 is a chart illustrating each coefficient for correcting the value of a current to be supplied to each light source according to temperature when brightness of B light is set as reference brightness.

DESCRIPTION OF EMBODIMENTS

Hereinafter, the embodiments will be described in detail with reference to the drawings. The following description is not intended to limit the invention. The components in the following description include the components that can be easily conceived by those skilled in the art, substantially the same components, and the components within a so-called equivalent range. Hereinafter, although a description is made with an example where a mobile phone is used as a mobile electronic device, the invention is not limited to mobile phones in its application. For example, the invention may also be applied to personal handyphone systems (PHS), PDAs, mobile navigation devices, notebook personal computers, gaming devices, or the like.

First Embodiment

Figure 1:
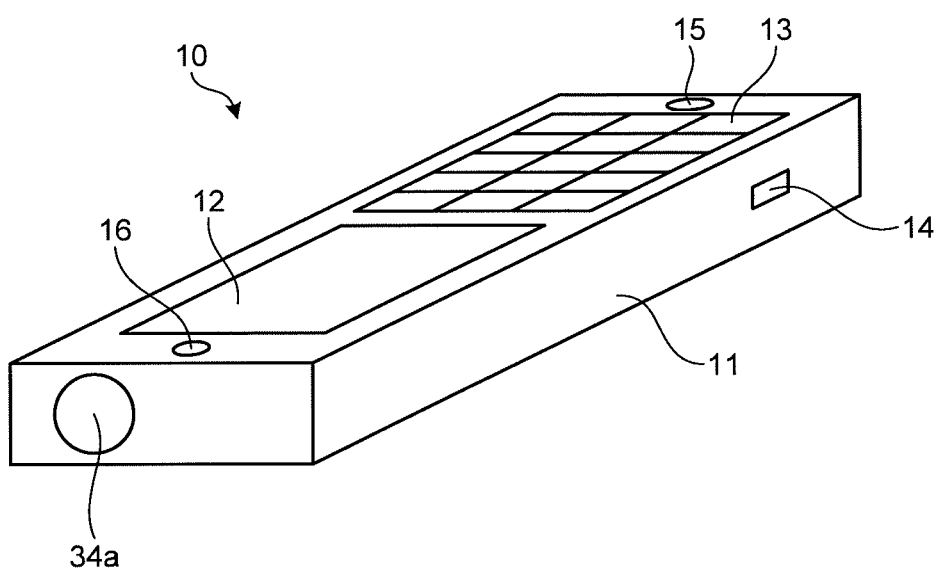
FIG. 1 is a perspective view illustrating the schematic configuration of an embodiment of a mobile electronic device.

First, the configuration of the appearance of a mobile electronic device will be described. FIG. 1 is a perspective view illustrating the schematic configuration of an embodiment of a mobile electronic device. A mobile electronic device 10 is a mobile phone having a wireless communication function. The mobile electronic device 10 is a straight mobile phone in which respective units are accommodated inside a single box-shaped housing 11. In the description of the present embodiment, the housing 11 has a single box shape, but the housing may be a foldable housing with two members connected to each other by a hinge, or a housing with two members disposed in a slidable manner. A housing with three or more members connected to one another may be used.

The housing 11 includes is provided with a display 12 illustrated in FIG. 1 as a display unit. The display 12 displays, as a predetermined image, a standby image which is displayed while the mobile electronic device 10 stands by for reception, a menu screen which is used to assist an operation on the mobile electronic device 10, or the like.

The housing 11 is provided with a plurality of operation keys 13 which are used to input the telephone number of a call party or letters at the time of mail composition or the like. A lateral part (one of the surfaces substantially perpendicular to the surface in which operation keys 13 are provided) of the housing 11 is provided with a dedicated key 14 which is used to control operation of a projector 34 described below. The operation keys 13 and the dedicated key 14 constitute an operation unit of the mobile electronic device 10. The housing 11 is also provided with a microphone 15 which receives a sound at the time of a call of the mobile electronic device 10, and a receiver 16 which makes a sound at the time of a call of the mobile electronic device 10.

In the upper surface (one side is abut on the surface in which the operation keys 13 are provided, and another side is abut on the surface in which the dedicated key 14 is provided) of the housing 11, a light emitting unit 34a of the projector 34 which projects an image is provided.

Figure 2:
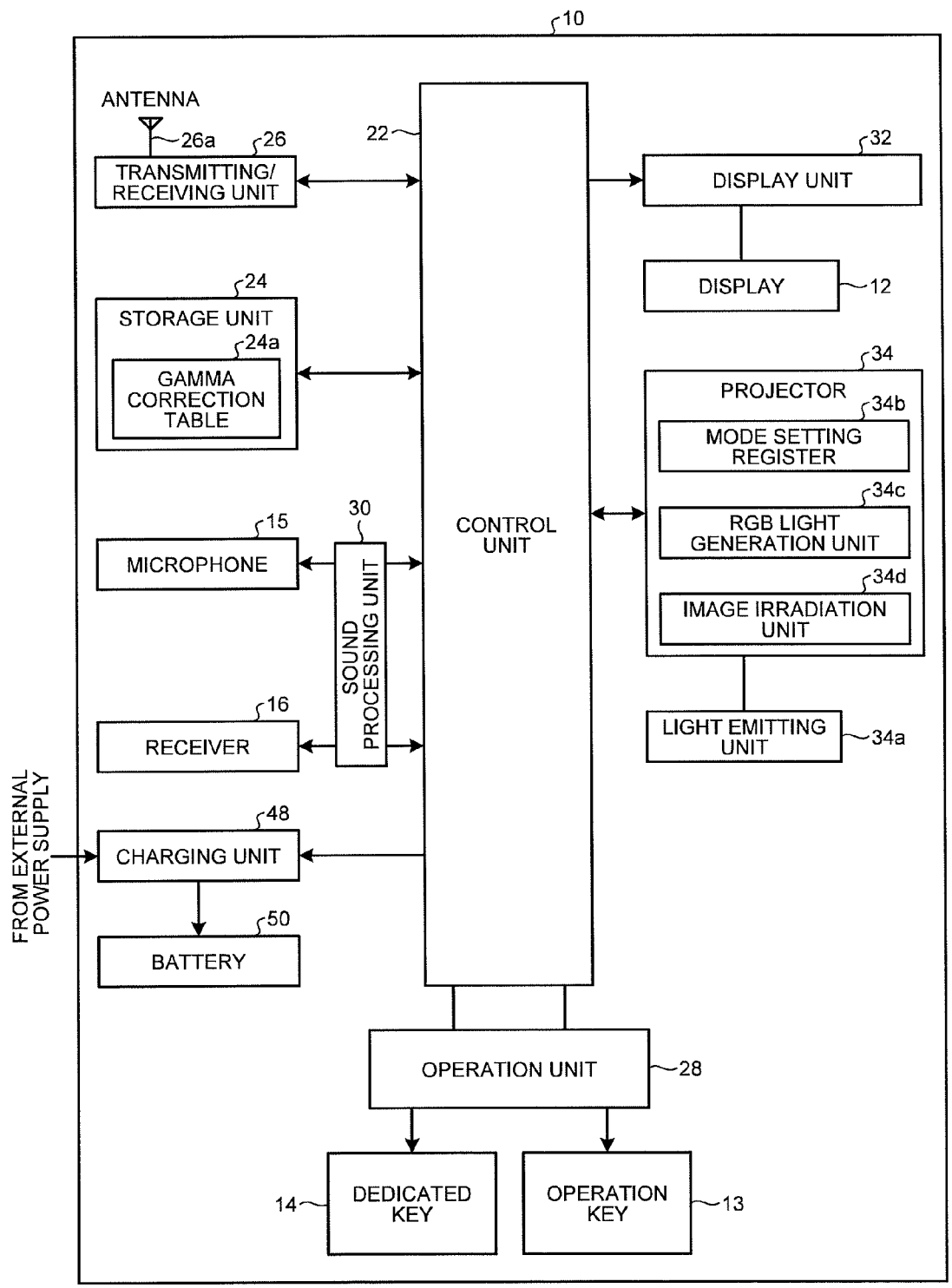
FIG. 2 is a block diagram illustrating the schematic configuration of a function of the mobile electronic device illustrated in FIG. 1.

FIG. 2 is a block diagram illustrating the schematic configuration of a function of the mobile electronic device illustrated in FIG. 1. As illustrated in FIG. 2, the mobile electronic device 10 has a control unit 22, a storage unit 24, a transmitting/receiving unit 26, an operation unit 28, a sound processing unit 30, a display unit 32, a projector 34, a charging unit 48, and a battery 50.

The control unit 22 is a processing unit, such as a central processing unit (CPU), which controls integrally the whole operation of the mobile electronic device 10. That is, the operations of the transmitting/receiving unit 26, the sound processing unit 30, the display unit 32, and the like are controlled such that various processes of the mobile electronic device 10 are performed in an appropriate sequence in accordance with an operation of the operation unit 28 or software which is stored in the storage unit 24 of the mobile electronic device 10. Various processes of the mobile electronic device 10 include, for example, voice call which is performed through a line switching network, composition and transmission/reception of electronic mails, browsing of Web (World Wide Web) sites on the Internet, and the like. The operations of the transmitting/receiving unit 26, the sound processing unit 30, the display unit 32, and the like include, for example, the transmission/reception of signals by the transmitting/receiving unit 26, input/output of a sound by the sound processing unit 30, display of images by the display unit 32, and the like.

The control unit 22 performs a process based on program (s) (for example, an operating system program, an application program, or the like) stored in the storage unit 24. The control unit 22 includes, for example, a micro processor unit (MPU), and performs various processes of the mobile electronic device 10 in accordance with a sequence instructed by the above-described software. That is, the control unit 22 performs a process by sequentially reading command codes from an operating system program, an application program, or the like stored in the storage unit 24.

The control unit 22 has a function of executing a plurality of application programs. The application programs which are executed by the control unit 22 include, for example, a plurality of application programs, such as an application program which controls driving of the projector, a game application program which runs various games, and the like.

The storage unit 24 stores software and data (for example, a gamma correction curve or the like) which is used for a process in the control unit 22, and stores a task which runs an application program for controlling the driving of the projector or a task which runs various game application programs. A gamma correction table 24a in the storage unit 24 stores a gamma correction curve described below.

In addition to these tasks, the storage unit 24 also stores, for example, communications, downloaded sound data, software which is used by the control unit 22 for the control of the storage unit 24, an address book for saving and managing telephone numbers and mail addresses and the like of call parties, sound files, such as a dialing tone or a ring tone, temporary data which is used for the process of software, or the like. A computer program or temporary data which is used in the process of software is temporarily stored in a work area which is allocated to the storage unit 24 by the control unit 22. The storage unit 24 is formed with, for example, a nonvolatile storage device (a nonvolatile semiconductor memory, such as a read only memory (ROM), a hard disk, or the like), a readable/writable storage device (for example, a static random access memory (SRAM) and a dynamic random access memory (DRAM)), or the like.

The transmitting/receiving unit 26 has an antenna 26a. The transmitting/receiving unit 26 establishes a wireless signal path by a CDMA system or the like with a base station through a channel allocated by the base station, and performs telephone communication and information communication with the base station.

The operation unit 28 is constituted by operation keys 13, such as a power key, a call key, numeric keys, letter keys, direction keys, an OK key, a send key, and the like, to which various functions are allocated, and a dedicated key 14. If each key is input by an operation of the user, a signal corresponding to the operation content is generated. The generated signal is input to the control unit 22 as an instruction of the user.

The sound processing unit 30 performs a process on a sound signal input to the microphone 15 and a sound signal output from the receiver 16. That is, the sound processing unit 30 amplifies the sound input from the microphone 15, performs analog-to-digital conversion (AD conversion) and a signal process, such as encoding, to convert a sound to digital sound data, and outputs the digital sound data to the control unit 22. Processes, such as decoding, digital-to-analog conversion (DA conversion), and amplification, are performed on sound data transmitted from the control unit 22 to convert the sound data to an analog sound signal, and the analog sound signal is output to the receiver 16.

The display unit 32 includes a display panel (the above-described display 12 or the like) which is constituted by a liquid crystal display (LCD) or an organic electro-luminescence (OEL) panel, and displays video based on video data or an image based on image data supplied from the control unit 22 on the display panel. With regard to the display unit 32, in addition to the display 12, for example, a sub display may be provided at a position which is exposed to the outside.

Figure 3:
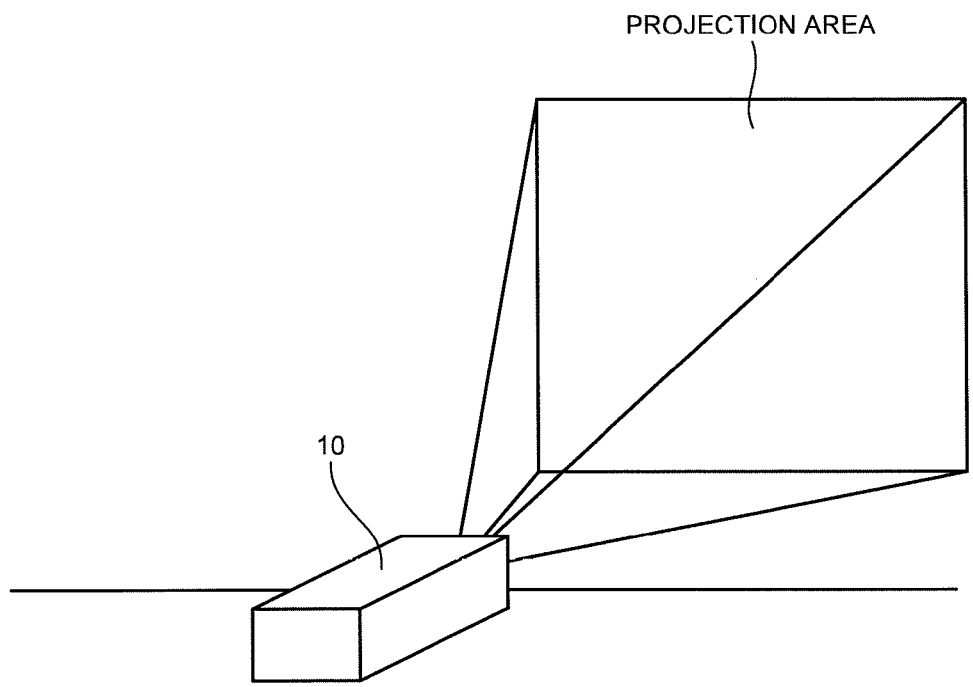
FIG. 3 is an explanatory view illustrating a state in which an image is projected by the mobile electronic device illustrated in FIG. 1.

The projector 34 is an image projection system which projects an image and, as described above, is provided with the light emitting unit 34a which projects an image on the upper surface of the housing 11. FIG. 3 is an explanatory view illustrating a state in which an image is projected by the mobile electronic device illustrated in FIG. 1. The mobile electronic device 10 projects an image from the light emitting unit 34a of the projector 34, that is, emits light which forms an image such that, as illustrated in FIG. 3, an image is projected on a predetermined area (projection area) of a wall surface or a screen which faces the upper surface of the housing 11. The projector 34 operates under the control of the control unit 22, and allows various kinds of image transmitted from the control unit 22, for example, movies or presentation materials, to be projected on the projection area.

The projector 34 has a mode setting register 34b, an RGB light generation unit 34c, and an image irradiation unit 34d.

A value is set to the mode setting register 34b by the control unit 22, and the RGB light generation unit 34c generates light in a mode according to the value set to the mode setting register 34b. The mode will be described below in detail.

The RGB light generation unit 34c functions as a light source which emits light described above, and has a light source which emits R (red) light, a light source which emits G (green) light, and a light source which emits B (blue) light. As the light source, a halogen light, a light emitting diode (LED) light source, an LD light source, a semiconductor laser, or the like may be used. The RGB light generation unit 34c also has an optical system for making the light emitted from each light source incident on a predetermined position of the image irradiation unit 34d at a predetermined angle. As the optical system, a liquid crystal display (LCD), a digital micro-mirror device (DMD), or the like may be used.

The image irradiation unit 34d switches whether or not to irradiate light in accordance with an image to be projected while changing the angle of the light emitted from the RGB light generation unit 34c to scan positions in the projection area at which light reaches. Light which has passed through the image irradiation unit 34d is emitted from the light emitting unit 34a toward the projection area. When a video of 30 frames per second is projected, the image irradiation unit 34d switches a position at which the light emitted from the RGB light generation unit 34c is projected such that the light of each of R, G, and B colors scans the entire surface of the projection area every 1/30 seconds.

The projector 34 has the above-described configuration. Thus, The projector 34 controls the light emitted from the RGB light generation unit 34c in accordance with an image to be projected by the image irradiation unit 34d, and projects light having passed through the image irradiation unit 34d from the light emitting unit 34a to project the image in the projection area.

The projector 34 may be configured such that pixels of optical system are disposed on the entire area of the projection area to correspond to each pixel thereof and turn on and off the light emitted from a light source according to an image to make the image projected on the entire surface of the projection area. For the projector 34, a projector may be used in which an optical system uses laser light as a light source, and has a switching element for switching whether or not to transmit the light emitted from the light source and a mirror for raster-scanning the light having passed through the switching element. In this case, the angle of the light emitted from laser light is changed by the mirror such that light irradiated from the light source scans the entire surface of the projection area, thereby projecting an image in the projection area.

The battery 50 supplies power to the respective units of the mobile electronic device 10. An external power supply (for example, an AC adapter, a USB host controller, or the like) is connected to the charging unit 48. When power is supplied from the external power supply, the charging unit 48 supplies power to the respective units of the mobile electronic device 10, and also charges the battery 50. The mobile electronic device 10 basically has the above-described configuration.

Figure 4:
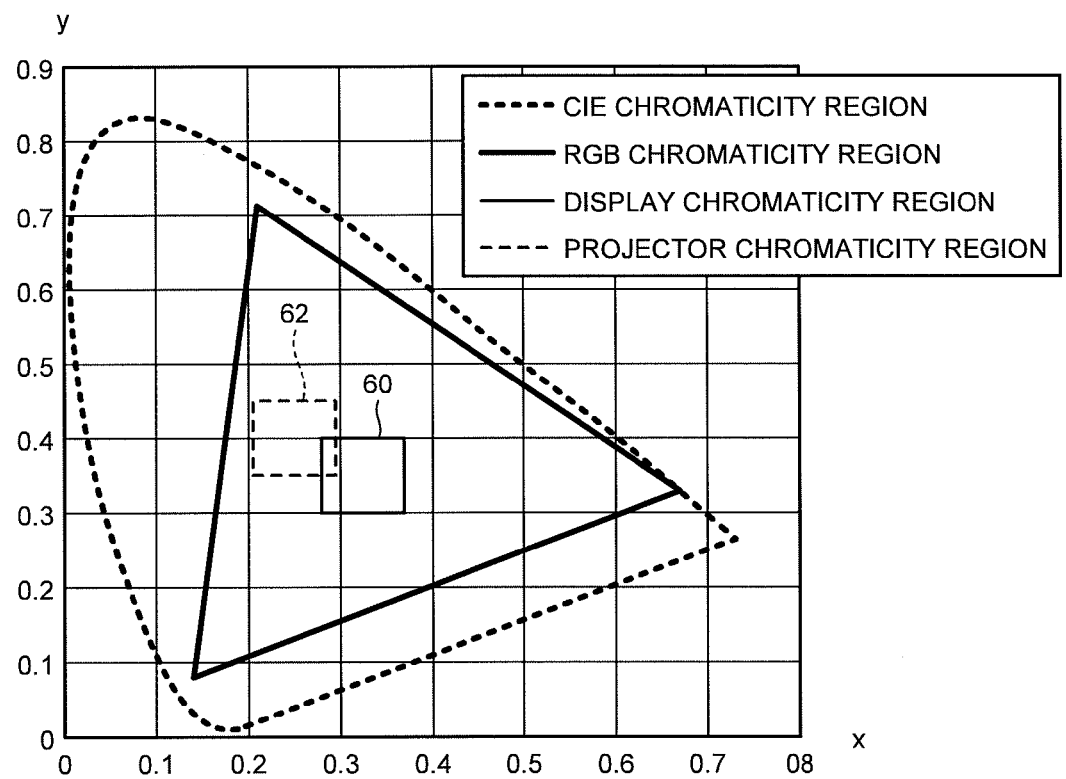
FIG. 4 is a diagram illustrating the chromaticity region of an image displayed on a display and the chromaticity region of an image projected by a projector.

FIG. 4 is a diagram illustrating, on the chromaticity diagram of the CIE (International Commission on Illumination) colorimetric system, a chromaticity region 60 of an image displayed by the display 12 when the display 12 performs display while the projector 34 does not perform projection, and a chromaticity region 62 of an image projected by the projector 34 when the projector 34 performs projection while the display 12 does not perform display, in a case where image data to be displayed by the mobile electronic device 10 is reference white (in the case of NTSC, (0.310, 0.316)). FIG. 5 is an enlarged view of the chromaticity regions 60 and 62 of FIG. 4. The chromaticity regions 60 and 62 are of a certain size because there is an individual difference in the display 12 and the projector 34.

As illustrated in FIGS. 4 and 5, when image data to be displayed is reference white, the chromaticity region 60 of the image displayed by the display 12 is substantially white, and the chromaticity region 62 of the image projected by the projector 34 is slightly green. The reason is as follows.

A display or a projector displays or projects various colors by mixing colors (for example, through the additive mixture of color or the like) of a plurality of light (for example, R, G, B, and the like). For example, when various colors are displayed or projected by the additive color-mixing of three colors of R, G, and B, luminance Y is expressed by the following expression:

$$Y = 0.2990 \times R + 0.5870 \times G + 0.1140 \times B. \quad (1)$$

That is, G light contributes to the luminance Y more than R and B.

In the projector, it is preferable to maintain a high luminance. However, since the mobile electronic device 10 usually operates with power supplied from the battery 50, it is preferable to reduce power consumption as much as possible.

Accordingly, in the present embodiment, the increase in the luminance Y and the reduction of power consumption are compromised, and in the projector 34, the amount of G light is relatively larger than the amount of R and B light. Thus, while an image projected by the projector 34 is slightly green, it is possible to increase the luminance Y and to reduce the power consumption as much as possible.

Although a case has been described where image data to be displayed is reference white, even when image data to be displayed is another color, and an image projected by the projector 34 is slightly green.

FIG. 6 is a diagram illustrating a combination of the operation states of the display 12 and the projector 34. As illustrated in FIG. 6, there may be four patterns including a case where the display 12 is turned off (OFF) and the projector 34 is turned off (OFF) (called pattern 1), a case where the display 12 is turned on (ON) and the projector 34 is turned off (OFF) (called pattern 2), a case where the display 12 is turned off (OFF) and the projector 34 is turned on (ON) (called pattern 3), and a case where the display 12 is turned on (ON) and the projector 34 is turned on (ON) (called pattern 4).

As in pattern 2 and pattern 3, when one of the display 12 and the projector 34 is turned on, as described above, even though the chromaticity of an image displayed by the display 12 and the chromaticity of an image projected by the projector 34 are different, there is no case where the user feels a sense of incompatibility. However, as in pattern 4, when both the display 12 and the projector 34 are turned on, as described above, if the chromaticity of an image displayed by the display 12 and the chromaticity of an image projected by the projector 34 are different, the user may feel a sense of incompatibility. Accordingly, in the present embodiment, in the case of pattern 4, the user is prevented from feeling a sense of incompatibility.

Next, the operation of the mobile electronic device 10, specifically, the control operations of the display 12 and the projector 34 will be described with reference to FIG. 7. FIG. 7 is a flowchart illustrating an example of the operation of the mobile electronic device to match the chromaticity of the projector and the chromaticity of the display at the time of the above-described pattern 4.

First, the mobile electronic device 10 performs a normal operation at Step S12. The normal operation refers to a state in which the projector 34 is not used, for example, display of a standby image, a call operation, sleep, suspend, or the like. Subsequently, the control unit 22 of the mobile electronic device 10 determines whether an instruction to activate the projector 34, that is, an activation instruction is input at Step S14. If it is determined that the activation instruction of the projector 34 is not input (No), the control unit 22 progresses to Step S12, and continues the normal operation. In this way, the control unit 22 repeats Step S12 and Step S14 until it is detected that the activation instruction of the projector 34 is input.

If it is determined at Step S14 that the projector activation instruction is input, that is, there is the activation instruction (Yes), the control unit 22 determines whether a simultaneous display mode of the projector 34 and the display 12, that is, the above-described pattern 4 is performed at Step S16.

If it is determined at Step S16 that the simultaneous display mode of the projector 34 and the display 12 is not performed (No), the control unit 22 activates the projector 34 and controls the projector 34 in the irradiation state at Step S24. The control unit 22 reads a task for controlling the operation of the projector 34 from the storage unit 24 and runs an application program. Thus, light is irradiated (emitted) from the projector 34, such that an image is projected on the projection area. In this case, "0x00" (referred to as the default value of the mode setting register 34b) is set in the mode setting register 34b, and the projector 34 is set in mode 0. The mode setting register 34b is mapped to the I/O address space of the CPU and is accessible from the CPU.

FIG. 8A is a diagram illustrating the control state of the RGB light generation unit 34c in mode 0 of the projector 34, that is, an example of a current value (mA), a voltage value (V), a duty ratio (%), and a power consumption value (W) of each of the R light source, the G light source, and the B light source, and a total value of power consumption of the R light source, the G light source, and the B light source.

If it is determined at Step S16 that the simultaneous display mode of the projector 34 and the display 12 is performed (Yes), the control unit 22 determines whether power is being supplied from an external power supply at Step S18.

If it is determined at Step S18 that power is being supplied from an external power supply (Yes), since the reduction in the charged amount of the battery 50 may not be taken into consideration, the control unit 22 sets "0x01" to the mode setting register 34b to perform the control such that the mode of the projector 34 is set to mode 1 in which a current supplied to each of the R light source and the B light source increases at Step S20. Thus, it is possible to match the chromaticity of an image projected by the projector 34 with the chromaticity of an image displayed by the display 12, thereby preventing the user from feeling a sense of incompatibility.

FIG. 8B is a diagram illustrating the control state of the RGB light generation unit 34c in mode 1 of the projector 34, that is, an example of the current value (mA), the voltage value (V), the duty ratio (%), the power consumption value (W) of each of the R light source, the G light source, and the B light source of the RGB light generation unit 34c, and the total value of power consumption of the R light source, the G light source, and the B light source. As illustrated in FIG. 8B, in mode 1, the current which is supplied to the R light source increases from 330 mA to 360 mA, and the current which is supplied to the B light source increases from 330 mA to 360 mA compared to mode 0.

Returning to FIG. 7, if it is determined at Step S18 that power is not supplied from the external power supply (No), since the reduction in the charged amount of the battery 50 should be taken into consideration, the control unit 22 sets "0x02" to the mode setting register 34b to perform the control such that the mode of the projector 34 is set to mode 2 in which the current which is supplied to the G light source decreases at Step S22. Thus, while the luminance of an image projected by the projector 34 is slightly lowered, it is possible to match the chromaticity of an image projected by the projector 34 with the chromaticity of an image displayed by the display 12, thereby preventing the user from feeling a sense of incompatibility.

FIG. 8C is a diagram illustrating the control state of the RGB light generation unit 34c in mode 2 of the projector 34, that is, an example of the current value (mA), the voltage value (V), the duty ratio (%), and the power consumption value (W) of each of the R light source, the G light source, and the B light source of the RGB light generation unit 34c in mode 2, and the total value of power consumption of the R light source, the G light source, and the B light source. As illustrated in FIG. 8C, in mode 2, the current which is supplied to the G light source decreases from 330 mA to 300 mA compared to mode 0.

At Step S22, the control unit 22 may set "0x03" to the mode setting register 34b to perform the control such that the mode of the projector 34 is set to mode 3 in which the duty ratio of the G light source is lowered. Thus, while the luminance of the image projected by the projector 34 is slightly lowered, it is possible to match the chromaticity of an image projected by the projector 34 with the chromaticity of an image displayed by the display 12, thereby preventing the user from feeling a sense of incompatibility.

FIG. 8D is a diagram illustrating the control state of the RGB light generation unit 34c in mode 3 of the projector 34, that is, an example of the current value (mA), the voltage value (V), the duty ratio (%), and the power consumption value (W) of each of the R light source, the G light source, and the B light source of the RGB light generation unit 34c in mode 3, and the total value of power consumption of the R light source, the G light source, and the B light source. As illustrated in FIG. 8D, in mode 3, the duty ratio of the G light source is lowered from 45% to 40%, the duty ratio of the R light source increases from 40% to 43%, and the duty ratio of the B light source increases from 15% to 17%, compared to mode 0.

If it is determined at Step S16 that the simultaneous display mode of the projector 34 and the display 12 is not performed (No), if the mode of the projector 34 is set to mode 1 at Step S20, or if the mode of the projector 34 is set to mode 2 or mode 3 at Step S22, the control unit 22 activates the projector 34 and controls the projector 34 in the irradiation state at Step S24.

Subsequently, the control unit 22 determines whether an instruction to continue the simultaneous display mode of the projector 34 and the display 12, that is, a continuation instruction is input at Step S26. If it is determined that the continuation instruction is input (Yes), the control unit 22 returns the process to Step S18. If it is determined that the continuation instruction is not input (No), the control unit 22 performs a process to terminate the projector 34 at Step S28, and returns the process to Step S12.

Figure 9:
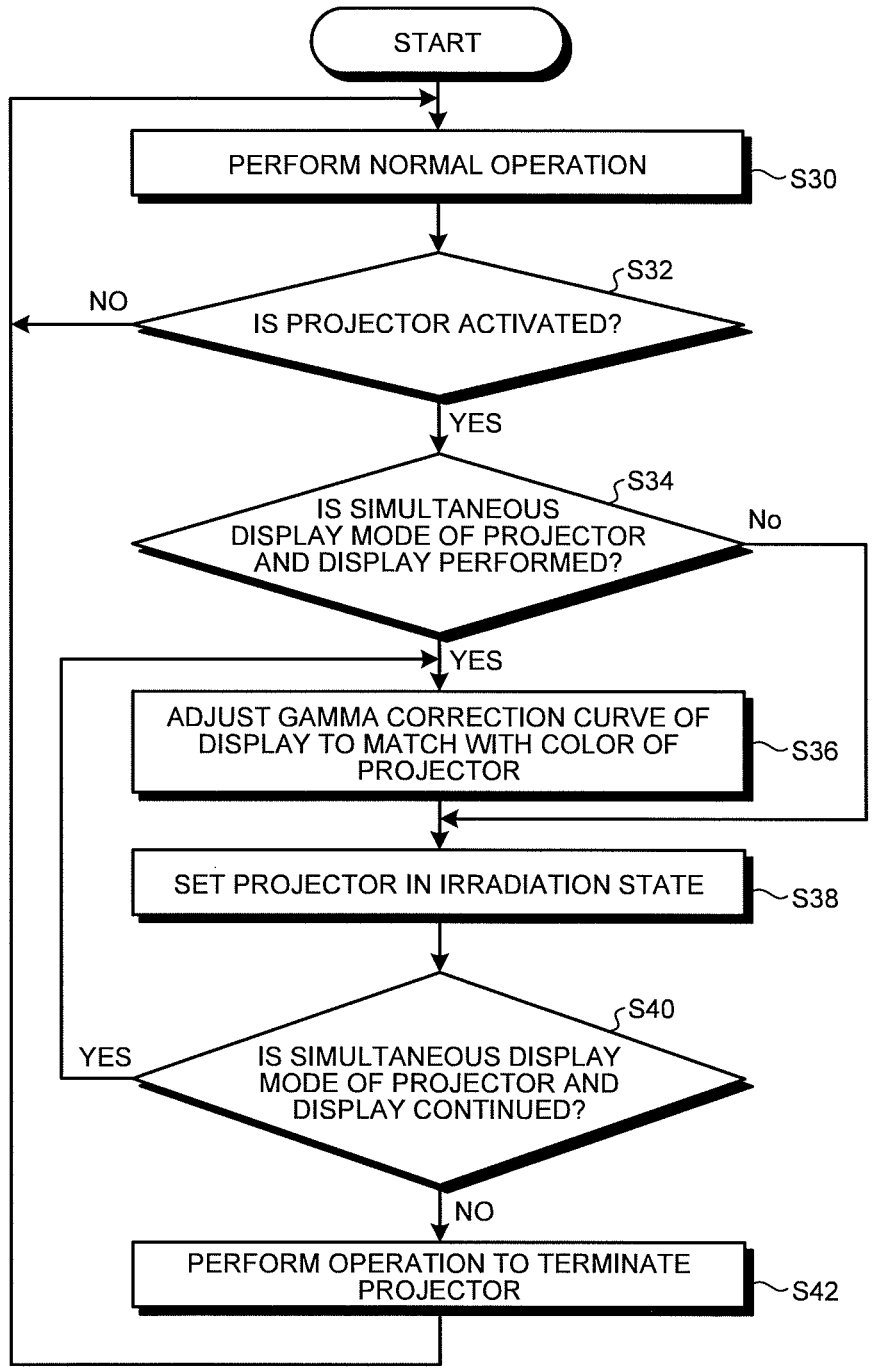
FIG. 9 is a flowchart illustrating an example of an operation of the mobile electronic device to match the chromaticity of a display with the chromaticity of a projector at the time of pattern 4.

Next, the operation of the mobile electronic device 10, specifically, the control operations of the display 12 and the projector 34 will be described with reference to FIG. 9. FIG. 9 is a flowchart illustrating an example of the operation of the mobile electronic device to match the chromaticity of a display with the chromaticity of a projector at the time of the above-described pattern 4.

First, the mobile electronic device 10 performs a normal operation at Step S30. The normal operation refers to a state in which the projector 34 is not used, for example, display of a standby image, a call operation, sleep, suspend, or the like. Subsequently, the control unit 22 of the mobile electronic device 10 determines whether an instruction to activate the projector 34, that is, an activation instruction is input at Step S32. If it is determined that the activation instruction of the projector 34 is not input (No), the control unit 22 progresses to Step S30, and continues the normal operation. In this way, the control unit 22 repeats Step S30 and Step S32 until it is detected that the activation instruction of the projector 34 is input.

If it is determined at Step S32 that the projector activation instruction is input, that is, there is the activation instruction (Yes), the control unit 22 determines whether a simultaneous display mode of the projector 34 and the display 12, that is, the above-described pattern 4 is performed at Step S34.

If it is determined at Step S34 that the simultaneous display mode of the projector 34 and the display 12 is not performed (No), the control unit 22 activates the projector 34 and controls the projector 34 in the irradiation state at Step S38. The control unit 22 reads a task for controlling the operation of the projector 34 from the storage unit 24, and runs an application program. Thus, light is irradiated (emitted) from the projector 34, such that an image is projected on the projection area.

Figure 10:
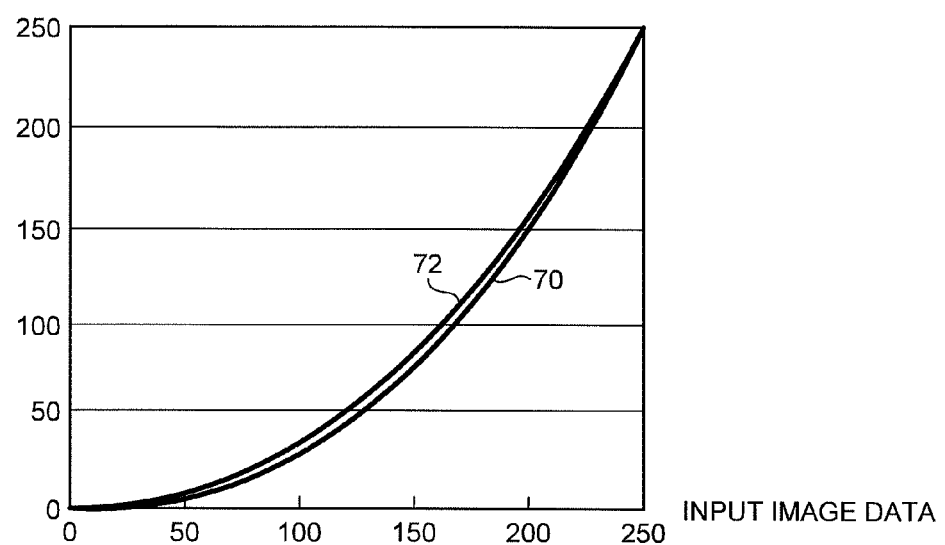
FIG. 10 is a diagram illustrating an example of a gamma correction curve.

FIG. 10 is a diagram illustrating an example of a gamma correction curve 70 when the simultaneous display mode of the projector 34 and the display 12 is not performed and a gamma correction curve 72 when the simultaneous display mode of the projector 34 and the display 12 is performed. If it is determined at Step S34 that the simultaneous display mode of the projector 34 and the display 12 is not performed (No), the control unit 22 performs the gamma correction on all pieces of the input image data of R, G, and B using the gamma correction curve 70, and performs the control such that an image is displayed on the display 12 on the basis of output image data after gamma correction using the gamma correction curve 70.

Returning to FIG. 9, if it is determined at Step S34 that the simultaneous display mode of the projector 34 and the display 12 is to be executed (Yes), the control unit 22 adjusts the gamma correction curve of the display 12 to perform the control such that the chromaticity of an image displayed by the display 12 matches the chromaticity of an image projected by the projector 34 at Step S36. Specifically, the input image data of R and B is subjected to the gamma correction using the gamma correction curve 70 (see FIG. 10), and input image data of G is subjected to gamma correction using the gamma correction curve 72 (see FIG. 10). That is, the control unit 22 performs the control of increasing the amount of G light of the display 12 so as to be more than the amount of R and B light. Thus, while the chromaticity of an image displayed by the display 12 is slightly green, it is possible to match the chromaticity of an image displayed by the display 12 with the chromaticity of an image projected by the projector 34, thereby preventing the user from feeling a sense of incompatibility.

If it is determined at Step S34 that the simultaneous display mode of the projector 34 and the display 12 is not performed (No), or if the gamma correction curve of the display 12 is adjusted at Step S36, at Step S38, the control unit 22 activates the projector 34 and controls the projector 34 in the irradiation state.

Subsequently, the control unit 22 determines whether an instruction to continue the simultaneous display mode of the projector 34 and the display 12, that is, a continuation instruction is input at Step S40. If it is determined that the continuation instruction is input (Yes), the control unit 22 returns the process to Step S36. If it is determined that the continuation instruction is not input (No), the control unit 22 performs a process to terminate the operation of the projector 34 at Step S42, and returns the process to Step S30.

In the embodiment, a case has been described where the projector 34 (image projection unit) starts to project an image while the display 12 displays an image. However, the control may be performed similarly when the display 12 starts to display an image while the projector 34 (image projection unit) projects an image.

In the embodiment, the control state (mode) of the projector 34 (image projection unit) is controlled using the mode setting register 34b. However, the control state of the projector 34 (image projection unit) may be controlled by a program.

In the embodiment, the chromaticity of an image projected by the projector 34 is controlled by mode setting. However, the control may be performed by gamma correction. In the embodiment, the chromaticity of an image displayed by the display 12 is controlled by gamma correction. However, the control may be performed by mode setting.

As described above, the mobile electronic device 10 matches the chromaticity of an image projected by the projector 34 and the chromaticity of an image displayed by the display 12, making it possible to prevent the operator from feeling a sense of incompatibility with an image projected by the projector 34 or an image displayed by the display 12.

Second Embodiment

In the second embodiment, a form in which a sense of incompatibility imposed on a user due to a difference between an image projected by a projector and an image displayed on a display is more preferably reduced will be described. The present embodiment includes a feature in that the brightness of the light emitted from the RGB light generation unit 34c is corrected on the basis of the temperature of the RGB light generation unit 34c serving as the light source of the projector 34. In the following description, a description will be provided as to a case where each light source in the RGB light generation unit 34c is an LED (light-emitting diode).

Figure 11A:
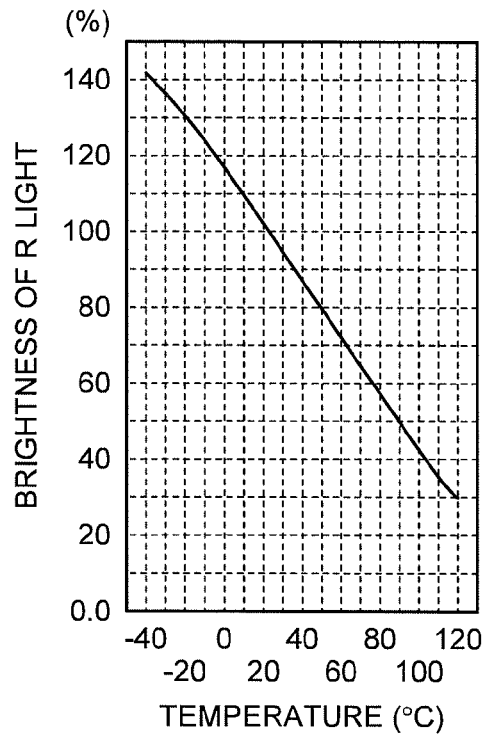
FIG. 11A is a graph illustrating the relation between the temperature of a light source which emits R light and the brightness of light which is emitted from the light source for emitting R light.
Figure 11B:
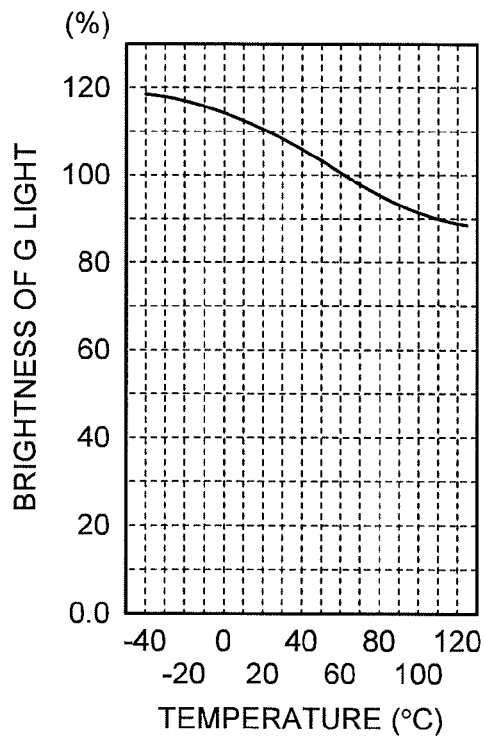
FIG. 11B is a graph illustrating the relation between the temperature of a light source which emits G light and the brightness of light which is emitted from the light source for emitting G light.
Figure 11C:
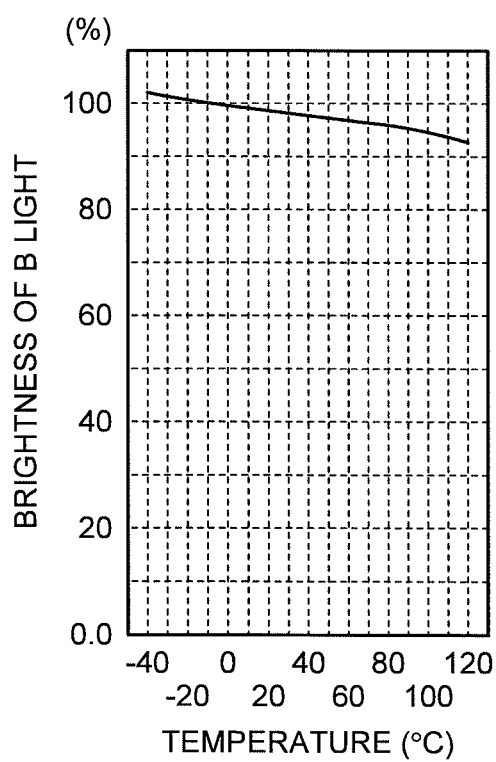
FIG. 11C is a graph illustrating the relation between the temperature of a light source which emits B light and the brightness of light which is emitted from the light source for emitting B light.

FIG. 11A is a graph illustrating the relation between the temperature of a light source which emits R light and the brightness of the light which is emitted from the light source for emitting R light. FIG. 11B is a graph illustrating the relation between the temperature of a light source which emits G light and the brightness of the light which is emitted from the light source for emitting G light. FIG. 11C is a graph illustrating the relation between the temperature of a light source which emits B light and the brightness of the light which is emitted from the light source for emitting B light. In FIGS. 11A to 11C, the horizontal axis represents the temperature of each light source, and the vertical axis represents the brightness of the light which is emitted from each light source. Hereinafter, 25° C. is referred to as a reference temperature. The reference temperature is the temperature of each light source immediately after the projector 34 starts to be used in a standard environment to be postulated. In FIGS. 11A to 11C, it is assumed that the brightness of the light which is emitted from each light source at the reference temperature is 100%.

As illustrated in FIGS. 11A to 11C, as the temperature of each light source increases, the brightness of the light which is emitted from each light source is lowered. In particular, as illustrated in FIG. 11A, R light has a large change rate in brightness of light due to a change in the temperature of the light source compared to light of the other colors. The change rate is a value obtained by dividing a difference between the brightness of light before the temperature is changed and the brightness of light after the temperature has been changed by the brightness of light before the temperature is changed. R light has a greater change rate due to a change in temperature compared to G light and B light. Accordingly, even though the temperature of the light sources equally increases, R light suffers a greater amount of decrease in its brightness than G light and B light. G light has a greater change rate due to a change in temperature compared to B light. Accordingly, even though the temperature of the light sources equally increases, G light suffers a greater amount of decrease in its brightness than B light. Thus, as the temperature of each light source increases, the brightness difference between the lights emitted from the light sources increases. When this happens, the brightness balance between the respective colors is lost. For this reason, it is considered that the user may feel a sense of incompatibility.

Figure 12:
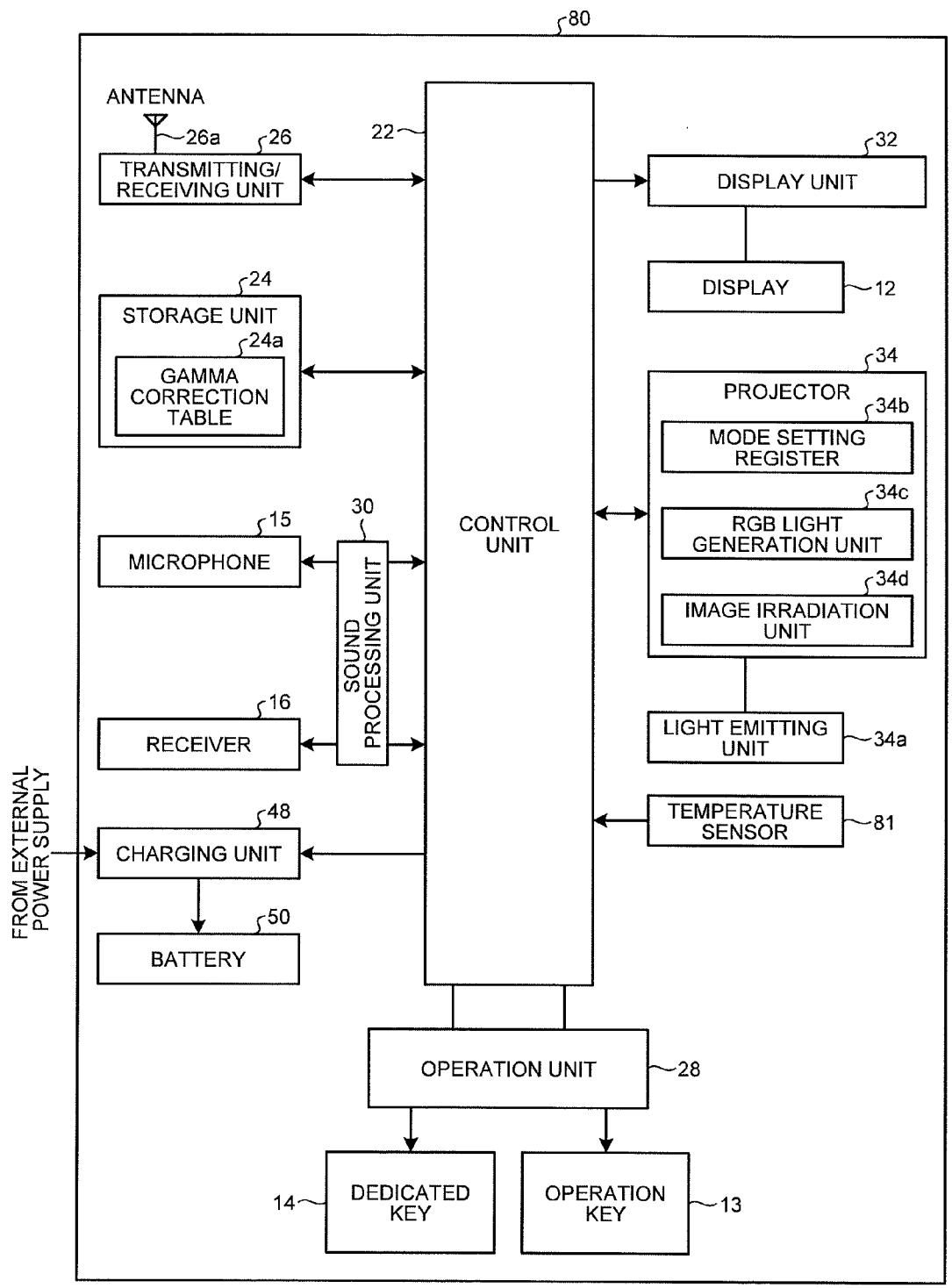
FIG. 12 is a block diagram illustrating the schematic configuration of a mobile electronic device including a temperature monitoring unit.

FIG. 12 is a block diagram illustrating the schematic configuration of a mobile electronic device including a temperature monitoring unit. As illustrated in FIG. 12, a mobile electronic device 80 according to the present embodiment includes a temperature sensor 81 serving as the temperature monitoring unit. The temperature sensor 81 is attached to, for example, the RGB light generation unit 34c. More specifically, the temperature sensor 81 is attached to, for example, the casing which accommodates each light source of the RGB light generation unit 34c. Thus, the temperature sensor 81 detects the temperature of each light source in the RGB light generation unit 34c. The temperature sensor 81 is electrically connected to the control unit 22. Therefore, the control unit 22 acquires temperature information, which is information relating to the temperature of each light source, from the temperature sensor 81.

It is preferable that three temperature sensors 81 in total are provided for the light sources which respectively emit R light, G light, and B light. In this case, the control unit 22 can acquire more accurate temperature information of each light source. The difference in temperature between the light sources is negligible. Thus, even when the temperature of each light source is regarded to be identical, and one temperature sensor 81 is provided in the RGB light generation unit 34c to collectively detect the temperature of each light source, it is possible to detect the temperature of each light source with precision for practical use.

In general, the mobile electronic device 80 may include a sensor for detecting the temperature of the battery 50 or a sensor for detecting the temperature of the housing 11. While the temperature of the battery 50 or the temperature of the housing 11 may be different from the temperature of each light source of the projector 34, both tend to be proportional to each other. The control unit 22 of the mobile electronic device 80 can estimate the temperature of each light source on the basis of the proportional relation. In this way, in the mobile electronic device 80 including the above-described sensors, these sensors may be used as the temperature sensors 81. With the above-described configuration, in the mobile electronic device 80, it is possible to reduce the number of temperature sensors 81 compared to a case where the three temperature sensors 81 in total are provided for the light sources. Therefore, in the mobile electronic device 80, it is possible to reduce manufacturing cost. In the mobile electronic device 80, it is also possible to suppress an increase in the size of the housing 11.

Figure 13:
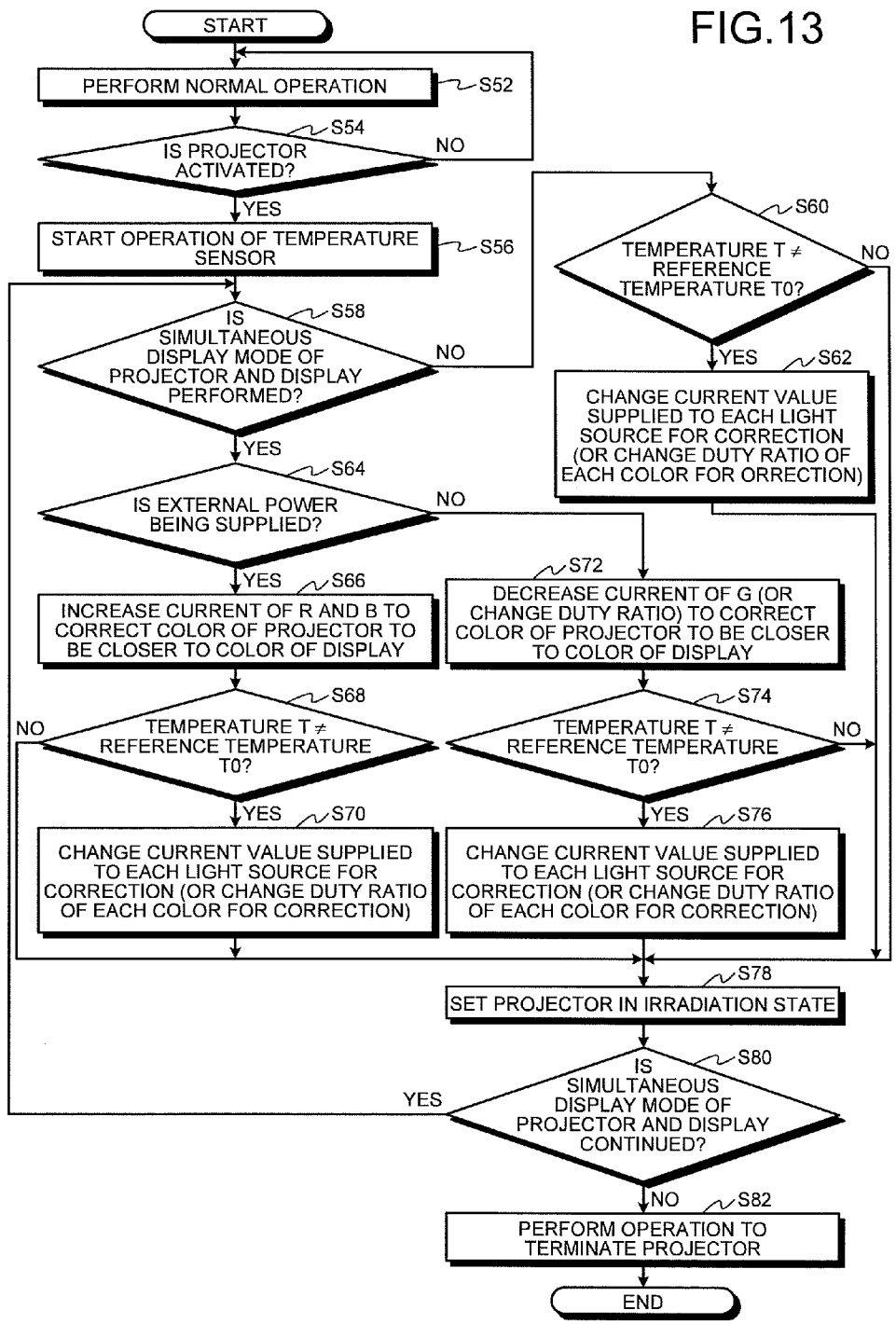
FIG. 13 is a flowchart illustrating an example of an operation of the mobile electronic device including a temperature monitoring unit.

FIG. 13 is a flowchart illustrating an example of the operation of the mobile electronic device including a temperature monitoring unit. First, the control unit 22 of the mobile electronic device 80 performs a normal operation at Step S52. The normal operation refers to a state in which the projector 34 is not used, for example, display of a standby image, a call operation, sleep, suspend, or the like. Subsequently, the control unit 22 determines whether an instruction to activate the projector 34, that is, an activation instruction is input at Step S54. If it is determined that the activation instruction of the projector 34 is not input (No), the control unit 22 progresses to Step S52, and continues the normal operation. In this way, the control unit 22 repeats Step S52 and Step S54 until it is detected that the activation instruction of the projector 34 is input.

If it is determined at Step S54 that the projector activation instruction is input, that is, there is the activation instruction (Yes), at Step S56, the control unit 22 starts the operation of the temperature sensor 81. Subsequently, the control unit 22 determines whether a simultaneous display mode of the projector 34 and the display 12, that is, the above-described pattern 4 is performed at Step S58. If it is determined at Step S58 that the simultaneous display mode of the projector 34 and the display 12 is not performed (No), the control unit 22 determines whether it is necessary to correct the brightness of the light emitted from each light source on the basis of the temperature information of each light source at Step S60. Specifically, the control unit 22 acquires the temperature T of each light source from the temperature sensor 81 as the temperature information, acquires and a reference temperature T0 from the storage unit 24. Then, the control unit 22 determines whether the temperature T is different from the reference temperature T0. The difference between the temperature T and the reference temperature T0 may be negligible. In this case, if the difference between the temperature T and the reference temperature T0 is within a predetermined value, the control unit 22 may process temperature T as the temperature equal to the reference temperature T0. The predetermined value is a value such that the user may not perceive the difference in brightness of light due to the temperature difference.

If it is determined at Step S60 that the temperature T is equal to the reference temperature T0 (No), the control unit 22 activates the projector 34 and controls the projector 34 in the irradiation state at Step S78. The control unit 22 reads a task for controlling the operation of the projector 34 from the storage unit 24 and runs an application program. Thus, light is irradiated (emitted) from the projector 34, so that an image is projected on the projection area. In this case, "0x00" (referred to as the default value of the mode setting register 34b) is set in the mode setting register 34b, and the projector 34 is set in mode 0. The mode setting register 34b is mapped to the I/O address space of the CPU and is accessible from the CPU. The control state of the RGB light generation unit 34c in this case, that is, the current value (mA), the voltage value (V), the duty ratio (%), and the power consumption value (W) of each of the R light source, the G light source, and the B light source, and the total value of power consumption of the R light source, the G light source, and the B light source become the values illustrated in FIG. 8A.

If it is determined at Step S60 that the temperature T is different from the reference temperature T0 (Yes), the control unit 22 corrects the brightness of R light, G light, and B light at Step S62. Specifically, the control unit 22 corrects the value of a current to be supplied to each of the light sources which respectively emit R light, G light, and B light. At this time, the current values to be corrected are the values of the currents in mode 0 illustrated in FIG. 8A.

FIG. 14 is a chart illustrating each coefficient for correcting the value of a current to be supplied to each light source, listed for each of some degrees of temperature. FIG. 15A is a diagram illustrating the control state of the RGB light generation unit when the brightness is corrected on the basis of temperature information in mode 0 of the projector. When correcting the brightness of the light emitted from each light source in mode 0, each coefficient of each color illustrated in FIG. 14 is multiplied by the value of a current to be supplied to each light source illustrated in FIG. 8A. For example, when the temperature T is 40° C., as illustrated in FIG. 14, the control unit 22 sets the coefficient for correcting the value of the current to be supplied to the light source for emitting R light to 105.3%. This coefficient is the reciprocal of the maintenance factor of R light at 40° C. illustrated in FIG. 11A. 105.3% is multiplied by 330 which is the value of the current set to be supplied to the light source for emitting R light illustrated in FIG. 8A before executing the correction, so that the control unit 22 corrects the value of the current to be supplied to the light source for emitting R light to 347.4 mA which is the current value illustrated in FIG. 15A.

As illustrated in FIG. 14, the control unit 22 sets the coefficient for correcting the value of the current to be supplied to the light source for emitting G light to 102.0%. This coefficient is the reciprocal of the maintenance factor of G light at 40° C. illustrated in FIG. 11B. 102.0% is multiplied by 330 which is the value of the current set to be supplied to the light source for emitting G light illustrated in FIG. 8A before executing the correction, such that the control unit 22 corrects the value of the current to be supplied to the light source for emitting G light to 336.7 mA which is the current value illustrated in FIG. 15A. As illustrated in FIG. 14, the control unit 22 sets the coefficient for correcting the value of the current to be supplied to the light source for emitting B light to 101.0%. This coefficient is the reciprocal of the maintenance factor of B light at 40° C. illustrated in FIG. 11C. 101.0% is multiplied by 330 which is the value of the current set to be supplied to the light source for emitting B light illustrated in FIG. 8A before executing the correction, so that the control unit 22 corrects the value of the current to be supplied to the light source for emitting B light to 333.3 mA which is the current value illustrated in FIG. 15A.

The storage unit 24 illustrated in FIG. 12 stores information illustrated in FIG. 14 in which the temperature of each light source is associated with each coefficient for correcting the value of the current to be supplied to each light source. The control unit 22 acquires the information from the storage unit 24. The control unit 22 acquires the current temperature T of each light source from the temperature sensor 81. The control unit 22 derives the coefficient associated with the current temperature T from the information acquired from the storage unit 24 for every light source. Then, the control unit 22 multiplies each derived coefficient by each value of the current to be supplied to each light source. In this way, the control unit 22 corrects the value of the current to be supplied to each light source on the basis of the temperature of each light source.

Returning to FIG. 13, at Step S78 following Step S62, the control unit 22 activates the projector 34 and controls the projector 34 in the irradiation state. The control unit 22 reads a task for controlling the operation of the projector 34 from the storage unit 24 and runs an application program. Thus, light is irradiated (emitted) from the projector 34, so that an image is projected on the projection area. At this time, the value of the current to be supplied to each light source is a value which is corrected on the basis of the temperature of each light source. Therefore, an image projected by the projector 34 becomes an image which is corrected such that the brightness of the light emitted from each light source becomes the reference brightness, that is, becomes the brightness of the light emitted from each light source when the temperature T of each light source is at the reference temperature T0. Accordingly, the projector 34 can reduce a sense of incompatibility that the user may feel.

The description will return to other steps. If it is determined at Step S58 that the simultaneous display mode of the projector 34 and the display 12 is performed (Yes), the control unit 22 determines whether power is being supplied from the external power supply at Step S64. If it is determined at Step S64 that power is being supplied from the external power supply (Yes), since the reduction in the charged amount of the battery 50 may not be taken into consideration, the control unit 22 sets "0x01" to the mode setting register 34b and performs the control such that the mode of the projector 34 is set to mode 1 in which the current supplied to the R light source and the B light source increases at Step S66. Therefore, it is possible to match the chromaticity of an image projected by the projector 34 with the chromaticity of an image displayed by the display 12, thereby reducing a sense of incompatibility that the user may feel.

Subsequently, the control unit 22 determines whether it is necessary to correct the brightness of the light emitted from each light source on the basis of the temperature information of each light source at Step S68. Specifically, the control unit 22 acquires the temperature T of each light source from the temperature sensor 81 as the temperature information, and acquires a reference temperature T0 from the storage unit 24. The control unit 22 determines whether the temperature T is different from the reference temperature T0. If it is determined at Step S68 that the temperature T is equal to the reference temperature T0 (No), the control unit 22 activates the projector 34 and controls the projector 34 in the irradiation state at Step S78. At this time, "0x01" is set in the mode setting register 34b. The control state of the RGB light generation unit 34c in this case, that is, the current value (mA), the voltage value (V), the duty ratio (%), and the power consumption value (W) of each of the R light source, the G light source, and the B light source, and the total value of power consumption of the R light source, the G light source, and the B light source become the values illustrated in FIG. 8B.

If it is determined at Step S68 that the temperature T is different from the reference temperature T0 (Yes), the control unit 22 corrects brightness of R light, G light, and B light at Step S70. Specifically, the control unit 22 corrects the value of a current to be supplied to each of the light sources which respectively emit R light, G light, and B light. At this time, the current values to be corrected are the values of the currents in mode 1 illustrated in FIG. 8B.

FIG. 15B is a diagram illustrating the control state of the RGB light generation unit when correcting the brightness on the basis of the temperature information in mode 1 of the projector. As illustrated in FIG. 15B, when correcting the brightness of the light emitted from each light source in mode 1, the coefficient of each color illustrated in FIG. 14 is multiplied by the value of the current to be supplied to the corresponding light source illustrated in FIG. 8B. For example, when the temperature T is 60° C., as illustrated in FIG. 14, the control unit 22 sets the coefficient for correcting the value of the current to be supplied to the light source for emitting R light to 117.6%. This coefficient is the reciprocal of the maintenance factor of R light at 60° C. illustrated in FIG. 11A. 117.6% is multiplied by 360 which is the value of the current that is set to be supplied to the light source for emitting R light illustrated in FIG. 8B before executing the correction, so that the control unit 22 corrects the value of the current to be supplied to the light source for emitting R light to 423.5 mA which is the current value illustrated in FIG. 15B.

As illustrated in FIG. 14, the control unit 22 sets the coefficient for correcting the value of the current to be supplied to the light source for emitting G light to 108.7%. This coefficient is the reciprocal of the maintenance factor of G light at 60° C. illustrated in FIG. 11B. 108.7% is multiplied by 330 which is the current value set to be supplied to the light source for emitting G light illustrated in FIG. 8B before executing the correction, so that control unit 22 corrects the value of the current to be supplied to the light source for emitting G light to 358.7 mA which is the current value illustrated in FIG. 15B. As illustrated in FIG. 14, the control unit 22 sets the coefficient for correcting the value of the current to be supplied to the light source for emitting B light to 102.0%. This coefficient is the reciprocal of the maintenance factor of B light at 60° C. illustrated in FIG. 11C. 102.0% is multiplied by 360 which is the current value set to be supplied to the light source for emitting B light illustrated in FIG. 8B before executing the correction, so that the control unit 22 corrects the value of the current to be supplied to the light source for emitting B light to 367.3 mA which is the current value illustrated in FIG. 15B.

Returning to FIG. 13, at Step S78 following Step S70, the control unit 22 activates the projector 34 and controls the projector 34 in the irradiation state. The control unit 22 reads a task for controlling the operation of the projector 34 from the storage unit 24 and runs an application program. Thus, light is irradiated (emitted) from the projector 34, so that an image is projected on the projection area. At this time, the value of the current supplied to each light source is a value which is corrected on the basis of the temperature of each light source. Therefore, an image projected by the projector 34 becomes an image which is corrected such that brightness of the light emitted from each light source becomes the reference brightness. As a result, the projector 34 can reduce a sense of incompatibility that the user may feel.

The description will return to other steps. If it is determined at Step S64 that power is not supplied from the external power supply (No), since the reduction in the charged amount of the battery 50 should be taken into consideration, the control unit 22 sets "0x02" to the mode setting register 34b and performs the control such that the mode of the projector 34 is set to mode 2 in which the current supplied to the G light source decreases at Step S72. Therefore, while the luminance of an image projected by the projector 34 is slightly lowered, it is possible to match the chromaticity of an image projected by the projector 34 with the chromaticity of an image displayed by the display 12, thereby reducing a sense of incompatibility that the user may feel.

Subsequently, the control unit 22 determines whether it is necessary to correct the brightness of the light emitted from each light source on the basis of temperature information of each light source at Step S74. Specifically, the control unit 22 acquires the temperature T of each light source from the temperature sensor 81 as the temperature information, and acquires a reference temperature T0 from the storage unit 24. The control unit 22 determines whether the temperature T is different from the reference temperature T0. If it is determined at Step S74 that the temperature T is equal to the reference temperature T0 (No), the control unit 22 activates the projector 34 and controls the projector 34 in the irradiation state at Step S78. At this time, "0x02" is set to the mode setting register 34b. The control state of the RGB light generation unit 34c in this case, that is, the current value (mA), the voltage value (V), the duty ratio (%), and the power consumption value (W) of each of the R light source, the G light source, and the B light source, and the total value of power consumption of the R light source, the G light source, and the B light source become the values illustrated in FIG. 8C.

If it is determined at Step S74 that the temperature T is different from the reference temperature T0 (Yes), the control unit 22 corrects brightness of R light, G light, and B light at Step S76. Specifically, the control unit 22 corrects the value of a current supplied to each of the light sources which respectively emit R light, G light, and B light. At this time, the current values to be corrected are the values of the currents in mode 2 illustrated in FIG. 8C.

FIG. 15C is a diagram illustrating the control state of the RGB light generation unit when the brightness is corrected on the basis of temperature information in mode 2 of the projector. As illustrated in FIG. 15C, when correcting the brightness of the light emitted from each light source in mode 2, each coefficient of each color illustrated in FIG. 14 is multiplied by the value of the current supplied to each light source illustrated in FIG. 8C. When the mobile electronic device 80 is used in an area where an ambient temperature is lower than the freezing point, the temperature T may become 0° C. When the temperature T is 0° C., as illustrated in FIG. 14, the control unit 22 sets the coefficient for correcting the value of the current supplied to the light source for emitting R light to 83.3%. This coefficient is the reciprocal of the maintenance factor of R light at 0° C. illustrated in FIG. 11A. 83.3% is multiplied by 330 which is the value of the current to be is supplied to the light source that emits R light illustrated in FIG. 8C before executing the correction, so that the control unit 22 corrects the value of the current supplied to the light source for emitting R light to 275.0 mA which is the current value illustrated in FIG. 15C.

As illustrated in FIG. 14, the control unit 22 sets the coefficient for correcting the value of the current supplied to the light source for emitting G light to 95.2%. This coefficient is the reciprocal of the maintenance factor of G light at 0° C. illustrated in FIG. 11B. 95.2% is multiplied by 300 which is the value of the current to be supplied to the light source for emitting G light illustrated in FIG. 8C, so that the control unit 22 corrects the value of the current supplied to the light source for emitting G light to 285.7 mA which is the current value illustrated in FIG. 15C. As illustrated in FIG. 14, the control unit 22 sets the coefficient for correcting the value of the current supplied to the light source for emitting B light to 99.0%. This coefficient is the reciprocal of the maintenance factor of B light at 0° C. illustrated in FIG. 11C. 99.0% is multiplied by 330 which is the current value set to be supplied to the light source for emitting B light illustrated in FIG. 8C before executing the correction, so that the control unit 22 corrects the value of the current to be supplied to the light source for emitting B light to 326.7 mA which is the current value illustrated in FIG. 15C.

Returning to FIG. 13, at Step S78 following Step S76, the control unit 22 activates the projector 34 and controls the projector 34 in the irradiation state. The control unit 22 reads a task for controlling the operation of the projector 34 from the storage unit 24 and runs an application program. Thus, light is irradiated (emitted) from the projector 34, so that an image is projected on the projection area. At this time, the value of the current supplied to each light source is a value which is corrected on the basis of the temperature of each light source. Therefore, an image projected by the projector 34 becomes an image which is corrected such that brightness of the light emitted from each light source becomes the reference brightness. As a result, the projector 34 can reduce a sense of incompatibility imposed on the user.

Subsequently, the control unit 22 determines whether an instruction to continue the operation of the projector 34 is input at Step S80. If it is determined that the instruction is input (Yes), the control unit 22 returns the process to Step S58, and performs a sequence of steps from Step S58. If it is determined at Step S80 that the instruction to continue the operation of the projector 34 is not input (No), the control unit 22 performs a process for terminating the operation of the projector 34 at Step S82, and ends the sequence of procedure. If the above-described sequence of procedure ends, the control unit 22 returns the process to Step S52 again and performs the above-described sequence of procedure.

As described above, the control unit 22 corrects the brightness of the light emitted from each light source on the basis of the change rate of brightness due to a change in temperature of each light of a plurality of colors. Specifically, the control unit 22 multiplies the reciprocal of the change rate of brightness due to a change in temperature of each light of a plurality of colors by the value of the current which is intended to be supplied to each light source to correct brightness of the light emitted from each light source. Thus, the brightness of the light emitted from each light source becomes closer to the value of the light emitted from each light source at the reference temperature. Therefore, even when the temperature of each light source is changed, the control unit 22 can keep the balance of the brightness of the colors. Accordingly, the control unit 22 can reduce a sense of incompatibility imposed on the user.

It is preferable that the control unit 22 switches whether or not to perform the correction of the brightness of light based on the temperature information in accordance with whether the RGB light generation unit 34c operates with the battery 50 or the RGB light generation unit 34c operates with the external power supply. For example, the control unit 22 does not perform Step S74 and Step S76. In this case, when the projector 34 operates with the battery 50, the control unit 22 does not perform the correction based on the temperature of each light source. If the correction based on the temperature of each light source is performed on the value of the current supplied to each light source, in the standard environment to be postulated, since the coefficients illustrated in FIG. 14 are used, the amount of power consumption by the projector 34 increases compared to the value before the correction based on the temperature. Thus, when the projector 34 operates with the battery 50, the control unit 22 does not perform the correction based on the temperature of each light source, thereby reducing the amount of power consumption by the projector 34. Therefore, the control unit 22 can operate the projector 34 with the battery 50 for a longer time. For example, when the RGB light generation unit 34c operates with the battery 50 in a state in which the external power supply is connected to the mobile electronic device 80 and the battery 50 is charged, it is regarded that the RGB light generation unit 34c operates with the external power supply.

FIG. 16 is a chart illustrating each coefficient for correcting the value of a current supplied to each light source according to temperature when brightness of R light is set as reference brightness. The above-described control unit 22 corrects the value of the current supplied to each light source such that the brightness of the light emitted from each light source actually becomes the reference brightness with the brightness of the light emitted from each light source at the reference temperature T0 as the reference brightness. The brightness of light as a reference in the control unit 22 is not limited to the brightness of the light emitted from each light source at the reference temperature T0. For example, if the current temperature T of each light source is at temperature T1, the control unit 22 may set brightness of any one of R light, G light, and B light emitted from the light sources at temperature T1 as the reference brightness.

As illustrated in FIGS. 11A to 11C, R light has a greater change rate of brightness due to a change in temperature compared to light of other colors. Thus, for example, the control unit 22 corrects the values of the currents supplied to other light sources to match the brightness of R light at the current temperature T1 of each light source. In this case, as illustrated in FIG. 16, the control unit 22 does not correct the value of the current supplied to the light source for emitting R light, and corrects the value of the current supplied to the light source for emitting G light and the value of the current supplied to the light source for emitting B light. In this case, when the temperature of each light source is changed, the control unit 22 can keep the balance of brightness of the colors. Therefore, the control unit 22 can reduce a sense of incompatibility imposed on the user.

With the use of the coefficients illustrated in FIG. 16, at higher than 25° C. which is the reference temperature in the standard environment to be postulated, the value of the current supplied to each light source becomes smaller than the value before the correction based on the temperature of each light source. Thus, in the standard environment, while the luminance of an image projected by the projector 34 is slightly lowered, the control unit 22 can reduce the power necessary for the operation of the projector 34. For example, at Step S76 illustrated in FIG. 13, the control unit 22 determines that the projector 34 operates with the battery 50 at Step S64. Accordingly, the control unit 22 should take into consideration the reduction in the charged amount of the battery 50. Therefore, it is preferable that, at Step S76, the control unit 22 uses the coefficients illustrated in FIG. 16. Thus, the mobile electronic device 80 can reduce the power consumption by the projector 34, thereby operating the projector 34 for a longer time.

FIG. 17 is a chart illustrating the coefficients for correcting the values of currents to be supplied to respective light sources for some temperatures when the brightness of B light is set as the reference brightness. When lowering the luminance of an image projected by the projector 34 and reducing the power required for the operation of the projector 34, it is preferable that the control unit 22 uses the coefficients illustrated in FIG. 17. The respective coefficients illustrated in FIG. 17 are coefficients for correcting the values of the currents to be supplied to different light sources so that the brightness of the lights from the light sources matches the brightness of B light. As illustrated in FIGS. 11A to 11C, in B light, the change rate of brightness caused by the change in temperature is small compared to the lights of the other colors. In this case, as illustrated in FIG. 17, the control unit 22 does not correct the value of the current supplied to the light source for emitting B light, but corrects the value of the current supplied to the light source for emitting R light and the value of the current supplied to the light source for emitting G light. In this case, when the temperature of each light source changes, the control unit 22 can keep the balance of brightness of the colors. Therefore, the control unit 22 can reduce a sense of incompatibility that the user may feel.

With the use of the coefficients illustrated in FIG. 17, the value of the current supplied to each light source becomes larger than that in a case where the control unit 22 uses the coefficients illustrated in FIG. 16, at 25° C. which is the reference temperature in the postulated standard environment or at the higher temperatures. However, with the use of the coefficients illustrated in FIG. 17, at 25° C., or higher, which is the reference temperature in the postulated standard environment, the value of the current supplied to each light source becomes smaller than the pre-correction value that is based on the temperature of each light source. Thus, in the standard environment, lowering the luminance of an image projected by the projector 34 can be suppressed, and the control unit 22 can reduce the power necessary for the operation of the projector 34. Next, a mobile electronic device which does not include the temperature sensor 81, and corrects the value of the current supplied to each light source on the basis of the temperature of each light source will be described.

Figure 18:
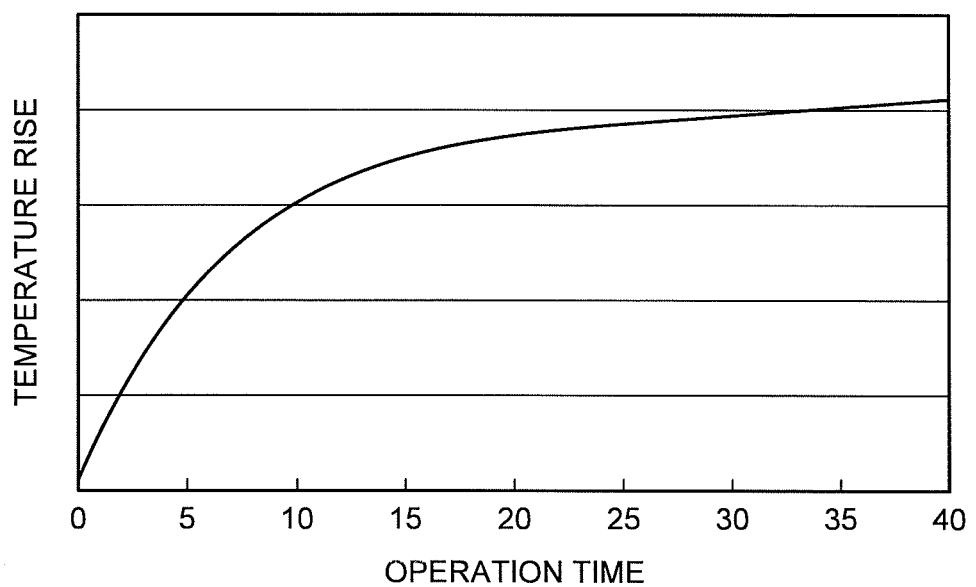
FIG. 18 is a graph illustrating the relation between the operation time of a projector and the amount of rise in temperature of each light source.
Figure 19:
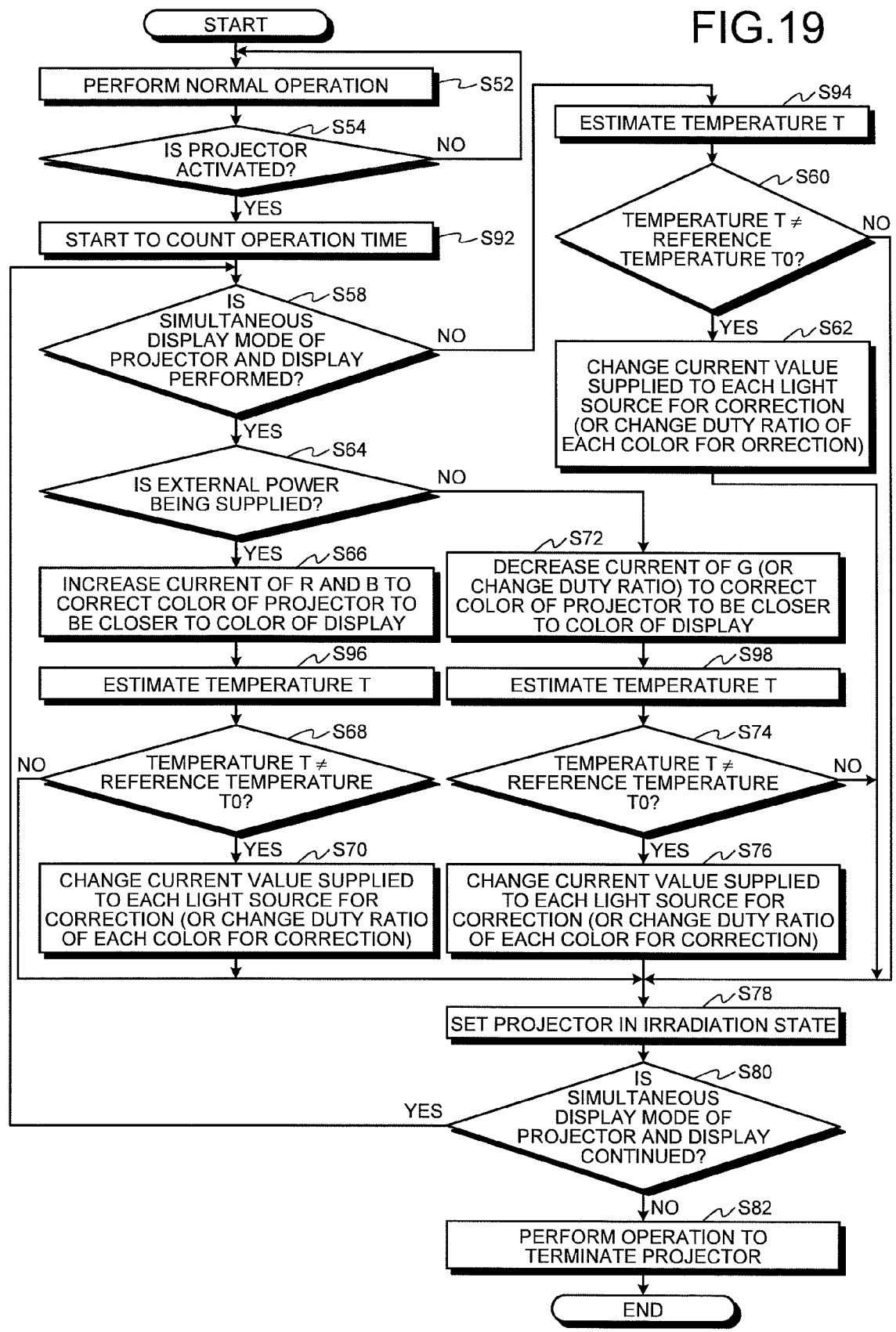
FIG. 19 is a flowchart illustrating an example of an operation of a mobile electronic device not including a temperature monitoring unit.

FIG. 18 is a graph illustrating the relation between the operation time of the projector and the amount of rise in temperature of each light source. FIG. 19 is a flowchart illustrating an example of the operation of a mobile electronic device not including a temperature monitoring unit. The operation time of the projector and the amount of rise in temperature of each light source have the relationship as illustrated in FIG. 18. Thus, as illustrated in FIG. 19, the control unit 22 performs Step S92 to start to count the operation time of the projector 34, instead of Step S56 illustrated in FIG. 13. In this case, the control unit 22 performs Step S94 to estimate the current temperature T of each light source immediately before Step S60. The control unit 22 performs Step S96 to estimate the current temperature T of each light source immediately before Step S68. The control unit 22 performs Step S98 to estimate the current temperature T of each light source immediately before Step S74.

Specifically, the storage unit 24 illustrated in FIG. 12 stores information illustrated in FIG. 18 in which the operation time of the projector 34 is associated with the amount of rise in temperature of each light source. The control unit 22 acquires the information from the storage unit 24. The control unit 22 derives the amount of rise in temperature associated with the current operation time of the projector 34 from the information acquired from the storage unit 24. Subsequently, the control unit 22 adds the derived amount of rise in temperature to, for example, 25° C. which is the reference temperature in the standard environment. Thus, the control unit 22 estimates the current temperature T of each light source. In this case, the mobile electronic device 80 can correct the value of the current supplied to each light source on the basis of the temperature of each light source without including the temperature sensor 81 illustrated in FIG. 12. Therefore, in the mobile electronic device 80, it is possible to reduce manufacturing cost. In the mobile electronic device 80, it is also possible to suppress an increase in the size of the housing 11.

In the above description, the control unit 22 changes the value of the current supplied to each light source to correct the brightness of the light emitted from the light source. However, the control unit 22 may change the duty ratio of each light source. If the duty ratio of each light source changes, the brightness of the light emitted from each light source also changes. In this case, for example, the control unit 22 multiplies each coefficient illustrated in FIG. 14 to each duty ratio illustrated in FIG. 8A to correct the duty ratio of each light source. In this case, when the temperature of each light source is changed, the control unit 22 can keep the balance of brightness of the colors. Therefore, the control unit 22 can reduce a sense of incompatibility that the user may feel.

Third Embodiment

In the third embodiment, a form in which a sense of incompatibility that the user may feel due to a difference between an image projected by a projector and an image displayed on a display is more preferably reduced will be described. The present embodiment includes a feature in that the chromaticity of the light emitted from the RGB light generation unit 34c is corrected on the basis of the chromaticity of an image displayed on the projection surface (wall surface, screen, or the like) by the projector 34. In the following description, a description will be provided as to a case where each light source in the RGB light generation unit 34c is an LED (light-emitting diode).

Figure 20:
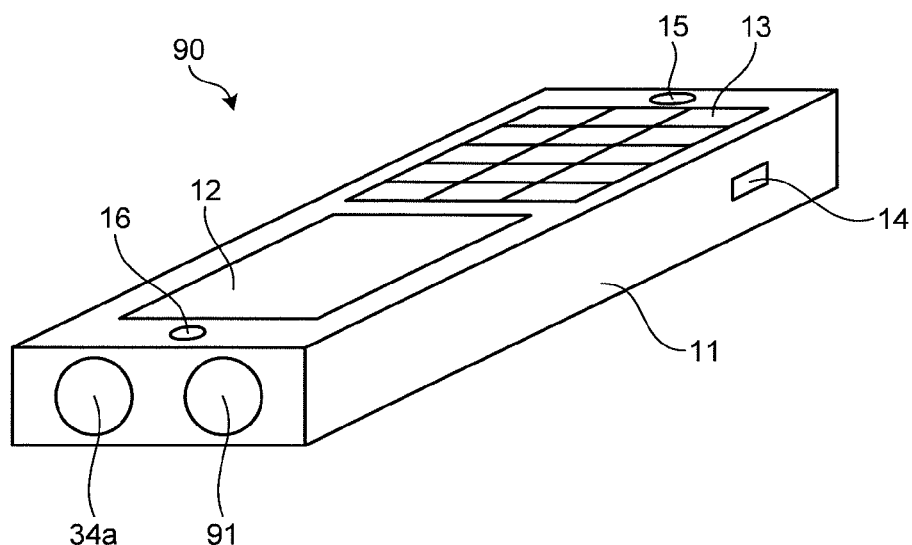
FIG. 20 is a perspective view illustrating the schematic configuration of a mobile electronic device including a chromaticity detection unit.
Figure 21:
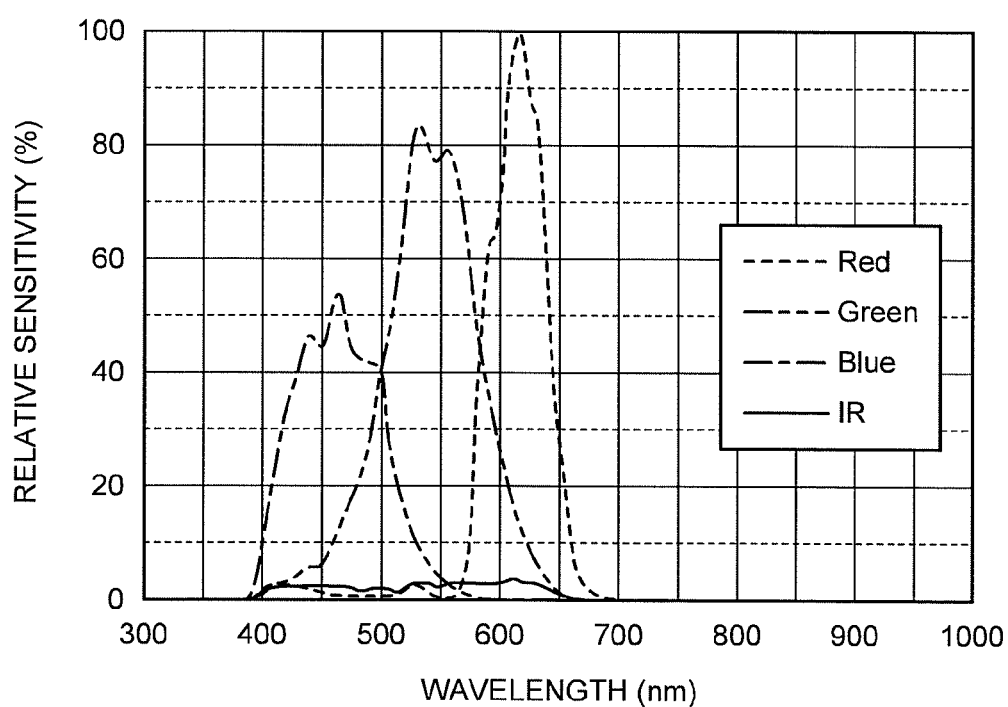
FIG. 21 is a graph illustrating the detection characteristic of a chromaticity detection unit.

First, the configuration of the appearance of a mobile electronic device will be described. FIG. 20 is a perspective view illustrating the schematic configuration of a mobile electronic device of the present embodiment. The upper surface (one side is abut on the surface in which the operation keys 13 are provided, and another side is abut on the surface in which the dedicated key 14 is provided) of a housing 11 of a mobile electronic device 90 is provided with the light emitting unit 34a of the projector 34 which projects an image, and an RGB sensor 91 serving as a chromaticity detection unit. The RGB sensor 91 is a sensor which can detect a visible light region having a wavelength of 380 nm to 780 nm separately for each color of R light, G light, and B light, and also can perform illuminance measurement. The RGB sensor 91 has a configuration in which optical filters of R, G, and B colors are combined with a three-channel photodiode, and can detect R light, G light, and B light with a single sensor. FIG. 21 is a graph illustrating an example of the relation between a wavelength (nm) which is detectable by the RGB sensor 91 and relative sensitivity (%) for each of R light, G light, and B light. In FIG. 21, the horizontal axis represents a wavelength (nm), and the vertical axis represents relative sensitivity (%) at each wavelength. In the graph of FIG. 21, it is assumed that the highest sensitivity of R light is 100%.

Figure 22:
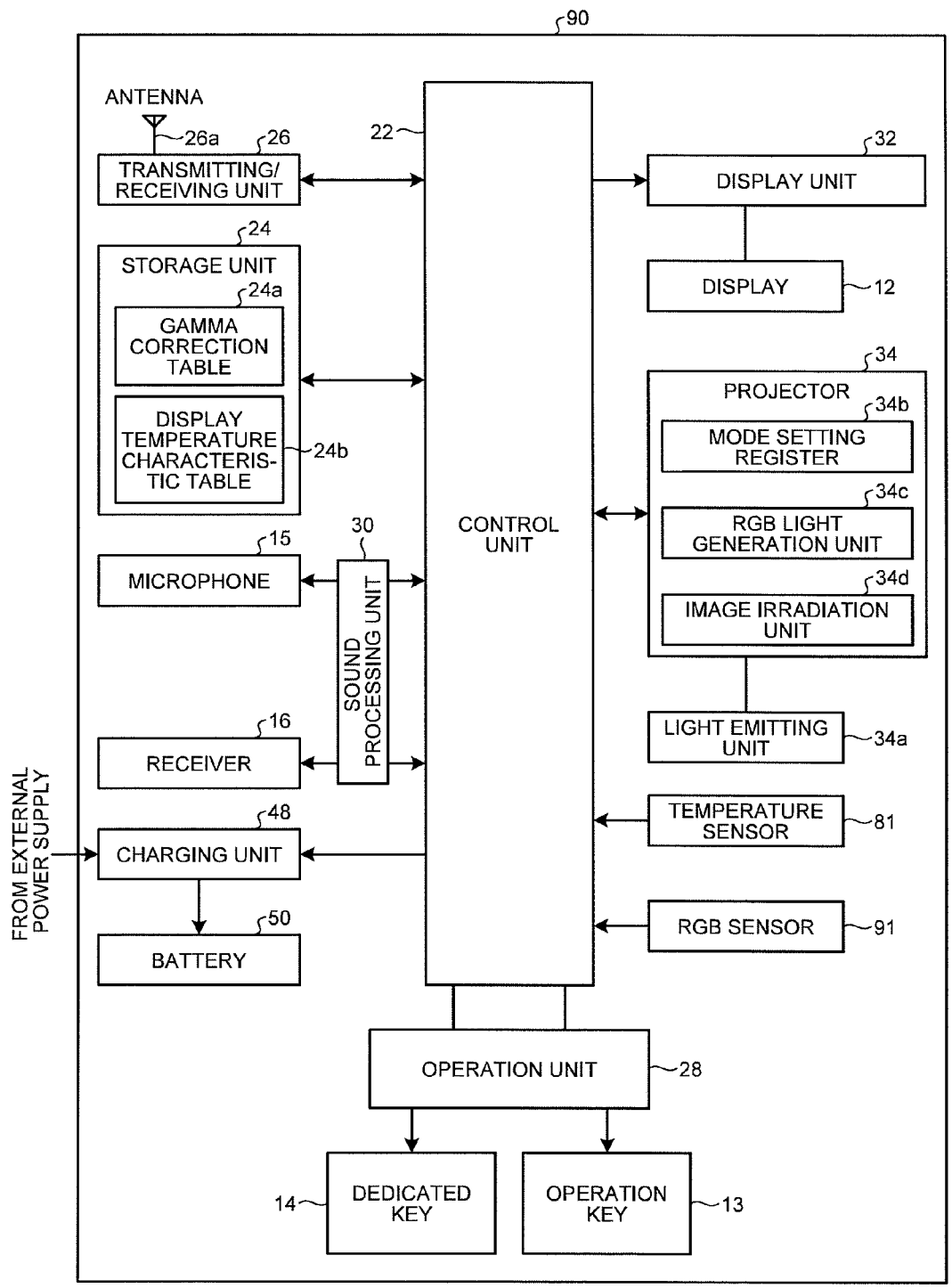
FIG. 22 is a block diagram illustrating the schematic configuration of a mobile electronic device including a chromaticity detection unit.

FIG. 22 is a block diagram illustrating the schematic configuration of a mobile electronic device including a chromaticity detection unit. As illustrated in FIG. 22, the mobile electronic device 90 of the present embodiment includes the RGB sensor 91 serving as a chromaticity detection unit. The RGB sensor 91 is attached to, for example, the surface of the housing 11 of the mobile electronic device 90 in which the light emitting unit 34a is provided. Thus, the RGB sensor 91 detects the chromaticity of a projection image projected from the light emitting unit 34a onto a wall surface, a screen, or the like. The RGB sensor 91 is electrically connected to the control unit 22. Thus, the control unit 22 acquires chromaticity information, which relates to the chromaticity of the projection image, from the RGB sensor 91.

The chromaticity of the display 12 changes depending on temperature. Thus, the storage unit 24 illustrated in FIG. 22 stores a display temperature characteristic table 24b in which the temperature and chromaticity of the display 12 are associated with each other. The control unit 22 makes reference to the display temperature characteristic table 24b to acquire the chromaticity associated with the temperature of the display 12.

In order to detect the temperature of the display 12, it is preferable that a temperature sensor is provided in the display 12. In this case, the control unit 22 can acquire more accurate temperature information of the display 12. While the temperature of the RGB light generation unit 34c may be different from the temperature of the display 12, both tend to be proportional to each other. The control unit 22 of the mobile electronic device 90 can estimate the temperature of the display 12 from the detection result of the temperature sensor 81, which detects the temperature of the RGB light generation unit 34c, on the basis of the proportional relation. In general, the mobile electronic device 90 may include a sensor which detects the temperature of the battery 50 or a sensor which detects the temperature of the housing 11. While the temperature of the battery 50 or the temperature of the housing 11 may be different from the temperature of the display 12, both tend to be proportional to each other. The control unit 22 of the mobile electronic device 90 can estimate the temperature of each light source on the basis of the proportional relation. In this way, in the mobile electronic device 90 including the above-described sensor, the sensor may be used as a temperature sensor which detects the temperature of the display 12. With the above-described configuration, in the mobile electronic device 90, it is possible to reduce the number of temperature sensors compared to a case where the temperature sensor is provided in the display 12. Therefore, in the mobile electronic device 90, it is possible to reduce manufacturing cost. In the mobile electronic device 90, it is also possible to suppress an increase in the size of the housing 11.

Figure 23:
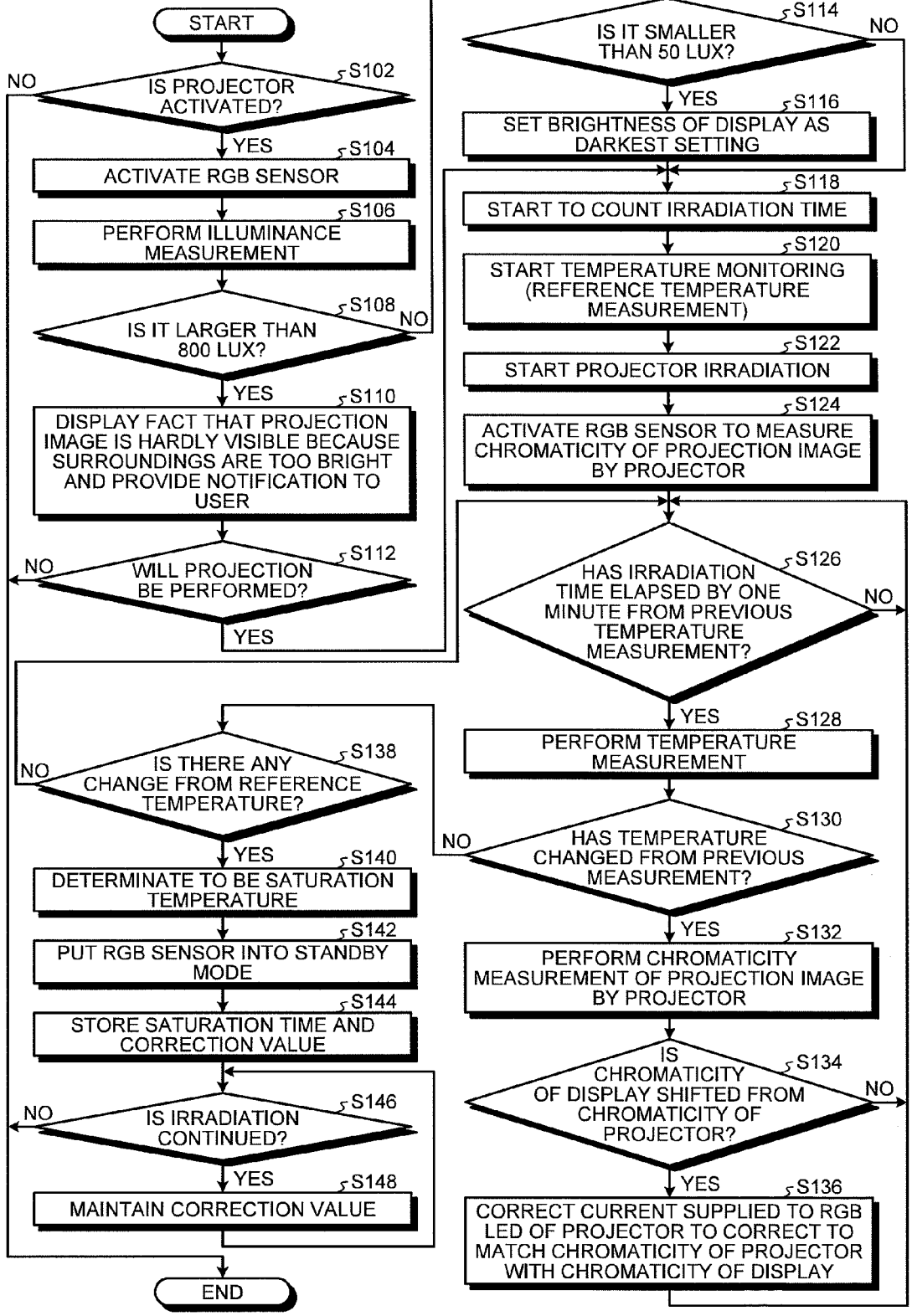
FIG. 23 is a flowchart illustrating an example of an operation of the mobile electronic device including a chromaticity detection unit.

Next, the operation of the mobile electronic device including the chromaticity detection unit, specifically, the control operations of the display 12 and the projector 34 will be described with reference to FIG. 23. FIG. 23 is a flowchart illustrating an example of the operation of the mobile electronic device to match the chromaticity of a projector with the chromaticity of a display at the time of the above-described pattern 4.

First, the control unit 22 of the mobile electronic device 90 determines whether an instruction to activate the projector 34, that is, an activation instruction is input at Step S102. If it is determined that the activation instruction of the projector 34 is not input (No), the control unit 22 ends the process.

If it is determined at Step S102 that the activation instruction of the projector 34 is input (Yes), the control unit 22 activates the RGB sensor 91 at Step S104. Then, the control unit 22 performs the control such that the RGB sensor 91 measures the ambient illuminance of the mobile electronic device 90 at Step S106.

Subsequently, the control unit 22 determines whether the ambient illuminance of the mobile electronic device 90 is larger than a predetermined first threshold value, for example, 800 lux, at Step S108. The threshold value mentioned herein is an example, therefore another threshold values may be used. The threshold value may be set by the user.

If it is determined at Step S108 that the ambient illuminance of the mobile electronic device 90 is larger than the predetermined first threshold value (Yes), the control unit 22 makes the display 12 display the fact that the surroundings of the mobile electronic device 90 are too much bright and the projection image is nearly invisible to notify the fact to the user at Step S110. The control unit 22 may output a sound representing the fact that the surroundings of the mobile electronic device 90 are too much bright and the projection image is nearly invisible by the receiver 16.

Subsequently, the control unit 22 determines whether an instruction to project an image, that is, a projection instruction is input at Step S112. If it is determined that the projection instruction is not input (No), the control unit 22 ends the process.

If it is determined at Step S108 that the ambient illuminance of the mobile electronic device 90 is smaller than the predetermined first threshold value (No), the control unit 22 determines whether the ambient illuminance of the mobile electronic device 90 is smaller than a predetermined second threshold value, for example, 50 lux, at Step S114. The threshold value mentioned herein is an example, therefore another threshold values may be used. The threshold value may be set by the user.

If it is determined at Step S114 that the ambient illuminance of the mobile electronic device 90 is smaller than the predetermined second threshold value (Yes), the control unit 22 sets the brightness of the display 12 to the darkest setting at Step S116. Thus, it is possible to reduce the power consumption, and to reduce a situation in which the user feels the image of the display 12 too bright. The brightness of the display 12 may be set to the darkest setting, and the brightness of the projector 34 may also be set to the darkest setting. Therefore, it is possible to further reduce the power consumption.

If it is determined at Step S112 that the projection instruction is input (Yes), if it is determined at Step S114 that the ambient illuminance of the mobile electronic device 90 is larger than a predetermined second threshold value (No), or if Step S116 is performed, the control unit 22 starts to measure the irradiation time of the projector 34 at Step S118.

Subsequently, the control unit 22 starts to monitor the temperature of the display 12 at Step S120. The control unit 22 stores the temperature of the display 12 measured when temperature monitoring starts in the storage unit 24 as a reference temperature.

Subsequently, the control unit 22 starts irradiation (image projection) by the projector 34 at Step S122. The control unit 22 reads a task for controlling the operation of the projector 34 from the storage unit 24 and runs an application program. Thus, light is irradiated (emitted) from the projector 34, so that an image is projected on the projection area.

Subsequently, the control unit 22 activates the RGB sensor 91 to measure the chromaticity of the projection image by the projector 34 and to acquire chromaticity information from the RGB sensor 91 at Step S124. In this way, the chromaticity of the projection image which is actually projected is acquired by the RGB sensor 91, thereby obtaining the following effects. For example, when a wall surface, a screen, or the like is not white, for example, is bluish, the projection image is viewed bluish. In this case, the control unit 22 acquires the chromaticity of the projection image, which is actually projected, by the RGB sensor 91, thereby identifying that the projection image is bluish. That is, the control unit 22 can measure the chromaticity of the projection image which is recognized by the user's eyes.

Subsequently, the control unit 22 determines whether the irradiation time has elapsed by a predetermined time, for example, one minute, from the previous temperature measurement at Step S126. The predetermined time mentioned herein is an example, therefore another predetermined time may be used. The predetermined time may be set by the user.

If it is determined at Step S126 that the irradiation time has not elapsed by the predetermined time from the previous temperature measurement (No), the control unit 22 stands by at Step S126.

If it is determined at Step S126 that the irradiation time has elapsed by the predetermined time from the previous temperature measurement (Yes), the control unit 22 measures the temperature of the display 12 at Step S128.

Subsequently, at Step S130, the control unit 22 determines whether the temperature of the display 12 measured at Step S128 has changed from the temperature at the time of previous measurement.

If it is determined at Step S130 that the temperature of the display 12 has changed from the temperature at the time of previous measurement (Yes), the control unit 22 measures the chromaticity of the projection image by the projector 34 using the RGB sensor 91 to acquire the chromaticity information from the RGB sensor 91 at Step S132.

Subsequently, the control unit 22 determines whether the chromaticity of an image displayed on the display 12 has shifted from the chromaticity of the image projected by the projector 34 at Step S134. The control unit 22 makes reference to the display temperature characteristic table 24b stored in the storage unit 24 and reads the chromaticity associated with the current temperature, thereby acquiring the chromaticity of the display 12. The control unit 22 can acquire the chromaticity of the projection image projected by the projector 34 through chromaticity measurement at Step S132. The control unit 22 compares the chromaticity of the display 12 with the chromaticity of the projection image projected by the projector 34 to determine whether the chromaticity of the image displayed on the display 12 has shifted from the chromaticity of the projection image projected by the projector 34.

If it is determined at Step S134 that the chromaticity of the image displayed on the display 12 has not shifted from the chromaticity of the projection image projected by the projector 34 (No), the control unit 22 progresses the process to Step S126.

If it is determined at Step S134 that the chromaticity of the image displayed on the display 12 has shifted from the chromaticity of the projection image projected by the projector 34 (Yes), at Step S136, the control unit 22 corrects the current value supplied to the LED serving as each of the light sources of R, G, and B of the projector 34 to correct the light emitted from each of the light sources of R, G, and B, so that the chromaticity of the projection image projected by the projector 34 is corrected to match (be close to) the chromaticity of the image displayed on the display 12. At this time, since the chromaticity of the projection image is measured by the RGB sensor 91 and fed back to the control unit 22, the control unit 22 corrects the current value supplied to the LED serving as each of the light sources of R, G, and B of the projector 34, such that the chromaticity of the projection image projected by the projector 34 can be corrected to match the desired chromaticity, that is, the chromaticity of the image displayed on the display 12. In this case, the control unit 22 corrects the current value supplied to the LED serving as each of the light sources of R, G, and B of the projector 34. However, the control unit 22 may change the duty ratio of each light source to correct the light emitted from each of the light sources of R, G, and B, so that the chromaticity of the projection image projected by the projector 34 may be corrected to match the chromaticity of the image displayed on the display 12. After Step S136 is performed, the control unit 22 progresses the process to Step S126.

If it is determined at Step S130 that the temperature of the display 12 does not change from the temperature at the time of previous measurement (No), the control unit 22 determines whether the current temperature changes from the reference temperature (measured at Step S120) at Step S138. If it is determined at Step S138 that the current temperature does not change from the reference temperature (No), the control unit 22 progresses the process to Step S126.

If it is determined at Step S138 that the current temperature changes from the reference temperature (Yes), the control unit 22 determines that the mobile electronic device 90 has reached a saturation temperature at Step S140.

Subsequently, the control unit 22 puts the RGB sensor 91 into a standby mode (low power consumption mode) at Step S142. The reason for putting the RGB sensor 91 into the standby mode is as follows. That is, when there is no change in temperature, there are little changes in the chromaticity of the image displayed on the display 12 and the chromaticity of the projection image projected by the projector 34, and it is not necessary to perform the chromaticity measurement using the RGB sensor 91. For this reason, the RGB sensor 91 is put into the standby mode, thereby reducing the power consumption.

Subsequently, at Step S144, the control unit 22 stores, in the storage unit 24, the saturation time which is the time from the start of the measurement of the irradiation time (Step S118) until the mobile electronic device 90 reaches the saturation temperature, and the correction value when the current value supplied to the LED serving as each of the light sources of R, G, and B of the projector 34 is corrected at Step S136.

Subsequently, the control unit 22 determines whether irradiation (image projection) is continued by the projector 34 at Step S146.

If it is determined at Step S146 that irradiation (image projection) is continued by the projector 34 (Yes), the control unit 22 maintains the correction values stored in the storage unit 24 at Step S144 to maintain the chromaticity of the projection image projected by the projector 34, at Step S148. The control unit 22 progresses the process to Step S146.

If it is determined at Step S146 that irradiation (image projection) is not continued by the projector 34 (No), the control unit 22 ends the process.

As described above, the mobile electronic device 90 detects the chromaticity of the projection image projected by the projector 34 using the RGB sensor 91, and corrects the light emitted from each of the light sources of R, G, and B of the projector 34, thereby matching the chromaticity of the projection image with the chromaticity of the image displayed on the display 12. That is, in the mobile electronic device 90, even when the chromaticity of the image displayed on the display 12 changes due to a rise in temperature, it is possible to match the chromaticity of the projection image projected by the projector 34 with the chromaticity of the image displayed on the display 12. Therefore, the mobile electronic device 90 can reduce a sense of incompatibility that the user may feel.

The mobile electronic device 90 detects the chromaticity of the projection image projected by the projector 34 using the RGB sensor 91, and corrects the light emitted from each of the light sources of R, G, and B of the projector 34, so that, even when a wall surface, a screen, or the like has colors other than white, it is possible to match the chromaticity of the projection image with the chromaticity of the image displayed on the display 12. For example, in the mobile electronic device 90, when a wall surface or the like is bluish, B light emitted from the B light source of the RGB light generation unit 34c of the projector 34 is weakened, or R light and G light emitted from the R light source and the G light source are enhanced, so that the chromaticity of the projection image projected by the projector 34 is corrected, thereby matching the chromaticity of the projection image with the chromaticity of the image displayed on the display 12. Therefore, the mobile electronic device 90 can reduce a sense of incompatibility that the user may feel.

The mobile electronic device 90 detects the chromaticity of the projection image projected by the projector 34 using the RGB sensor 91, and corrects the light emitted from each of the light sources of R, G, and B of the projector 34, so that, even when there is an individual difference in the projector 34, it is possible to match the chromaticity of the projection image projected by the projector 34 with the chromaticity of the image displayed on the display 12. Therefore, the mobile electronic device 90 can reduce a sense of incompatibility that the user may feel.

The mobile electronic device 90 can detect the ambient illuminance using the RGB sensor 91, and when the ambient illuminance is larger than the predetermined first threshold value, can notify the user of the fact that the surroundings of the mobile electronic device 90 are too bright and the projection image is nearly invisible. Therefore, the user can notice that the surroundings of the mobile electronic device 90 are too bright and the projection image is hardly visible.

The mobile electronic device 90 can detect the ambient illuminance using the RGB sensor 91, and when the ambient illuminance is smaller than the predetermined second threshold value, can set the brightness of the display 12 and the projector 34 to the darkest setting. Therefore, the mobile electronic device 90 can reduce the power consumption.

The mobile electronic device 90 detects the chromaticity of the projection image projected by the projector 34 using the RGB sensor 91 and corrects the light emitted from each of the light sources of R, G, and B of the projector 34, thereby matching the chromaticity of the projection image with the chromaticity of the image displayed on the display 12. Therefore, in the mobile electronic device 90, without replacing the light sources of the RGB light generation unit 34c, it is possible to match the chromaticity of the projection image projected by the projector 34 with the chromaticity of the image displayed on the display 12, thereby reducing a sense of incompatibility that the user may feel.

In the embodiment, the single RGB sensor 91 is provided, and the chromaticity of the projection image projected by the projector 34 is detected by the RGB sensor 91. However, another RGB sensor may be provided, and the chromaticity of the image displayed on the display 12 may be detected by another RGB sensor. Thus, it is possible to more accurately detect the chromaticity of the image displayed on the display 12 compared to a case where the display temperature characteristic table 24b is used. Moreover, even when there is an individual difference in the display 12, it is possible to accurately detect the chromaticity of the image displayed on the display 12. Therefore, in the mobile electronic device 90, it is possible to accurately match the chromaticity of the projection image projected by the projector 34 with the chromaticity of the image displayed on the display 12, thereby further reducing a sense of incompatibility that the user may feel.

INDUSTRIAL APPLICABILITY

As described above, the mobile electronic device according to the invention is useful in that an image projected by the projector and an image displayed on the display does not cause a sense of incompatibility.

The invention claimed is:

1. A mobile electronic device, comprising:
a battery;
an image projection unit for projecting an image;
an image display unit for displaying an image;
a control unit for controlling the image projection unit and the image display unit; and
a temperature monitoring unit for measuring or for estimating the temperature of a light source of the image projection unit,
wherein
the control unit performs, when the image projection unit projects an image and the image display unit displays an image, control for making the chromaticity of the image projected by the image projection unit and the chromaticity of the image displayed by the image display unit match each other;
when performing control of matching the chromaticity, the control unit acquires temperature information from the temperature monitoring unit, and controls the light source on the basis of the temperature information such that the brightness of the light emitted from the light source is close to reference brightness;
the image projection unit projects an image by performing a color-mixing with respect to lights of a plurality of colors,
the control unit performs control on the basis of a change rate of brightness caused by change in temperature for each light of the plurality of colors such that brightness of the light emitted from the light source is close to the reference brightness; and
the control unit switches the control between performing and not-performing control of making the brightness of each color closer to the reference brightness, in accordance with whether the image projection unit is operating with power supplied from the battery or the image projection unit is operating with power supplied from an external power supply.

2. The mobile electronic device according to claim 1,
wherein the control unit performs, when the image projection unit is operating with power from the external power supply, control such that the brightness of the light emitted from the light source is close to the reference brightness.

3. A mobile electronic device, comprising:
an image projection unit for projecting an image;
an image display unit for displaying an image;
a control unit for controlling the image projection unit and the image display unit; and
a temperature monitoring unit for measuring or for estimating the temperature of a light source of the image projection unit,
wherein
the control unit performs, when the image projection unit projects an image and the image display unit displays an image, control for making the chromaticity of the image projected by the image projection unit and the chromaticity of the image displayed by the image display unit match each other;
when performing control of matching the chromaticity, the control unit acquires temperature information from the temperature monitoring unit, and controls the light source on the basis of the temperature information such that the brightness of the light emitted from the light source is close to reference brightness;
the image projection unit projects an image by performing a color-mixing with respect to lights of a plurality of colors,
the control unit performs control on the basis of a change rate of brightness caused by change in temperature for each light of the plurality of colors such that brightness of the light emitted from the light source is close to the reference brightness; and
the control unit performs control such that the brightness of the light emitted from the light source is close to the reference brightness, using the current brightness of a light of a color having a maximum change rate of brightness caused by change in temperature, from among the lights of the plurality of colors, as the reference brightness.

4. The mobile electronic device according to claim 1,
wherein the control unit performs, when the image projection unit is operating with power supplied from the battery, control such that the brightness of the light emitted from the light source is close to the reference brightness, using the current brightness of color having a maximum change rate of brightness caused by change in temperature, from lights of the plurality of colors, as the reference brightness.

* * * * *